(12) United States Patent
Kim et al.

(10) Patent No.: US 10,754,242 B2
(45) Date of Patent: Aug. 25, 2020

(54) ADAPTIVE RESOLUTION AND PROJECTION FORMAT IN MULTI-DIRECTION VIDEO

(71) Applicant: Apple Inc., Cupertino, CA (US)

(72) Inventors: Jae Hoon Kim, San Jose, CA (US); Ming Chen, Cupertino, CA (US); Xiaosong Zhou, Campbell, CA (US); Hsi-Jung Wu, San Jose, CA (US); Dazhong Zhang, Milpitas, CA (US); Hang Yuan, San Jose, CA (US); Jiefu Zhai, San Jose, CA (US); Chris Y. Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/638,848

(22) Filed: Jun. 30, 2017

(65) Prior Publication Data
US 2019/0004414 A1 Jan. 3, 2019

(51) Int. Cl.
*G03B 37/04* (2006.01)
*G06T 3/40* (2006.01)
(Continued)

(52) U.S. Cl.
CPC ............ *G03B 37/04* (2013.01); *G06T 3/0012* (2013.01); *G06T 3/4038* (2013.01);
(Continued)

(58) Field of Classification Search
CPC .... G03B 37/04; H04N 19/159; H04N 19/172; H04N 5/23238; H04N 13/02; G06T 3/4038
See application file for complete search history.

(56) References Cited

U.S. PATENT DOCUMENTS 4,890,257 A 12/1989 Anthias et al.
5,185,667 A 2/1993 Zimmerman
(Continued)

FOREIGN PATENT DOCUMENTS

EP 2077525 A1 7/2009
WO WO 2012/044709 A1 4/2012
(Continued)

OTHER PUBLICATIONS

Choi et al.; "Text of ISO/IEC 23000-20 CD Omnidirectional Media Application Format"; Coding of Moving Pictures and Audio; ISO/IEC JTC1/SC29/WG11 N16636; Jan. 2017; 51 pages.
(Continued)

*Primary Examiner* — Jefferey F Harold
*Assistant Examiner* — Sean N. Haiem
(74) *Attorney, Agent, or Firm* — BakerHostetler

(57) ABSTRACT

Techniques are described for implementing format configurations for multi-directional video and for switching between them. Source images may be assigned to formats that may change during a coding session. When a change occurs between formats, video coders and decoder may transform decoded reference frames from the first format to the second format. Thereafter, new frames in the second configuration may be coded or decoded predictively using transformed reference frame(s) as source(s) of prediction. In this manner, video coders and decoders may use intra-coding techniques and achieve high efficiency in coding.

22 Claims, 11 Drawing Sheets

(51) Int. Cl.
*H04N 5/232* (2006.01)
*H04N 19/172* (2014.01)
*H04N 19/159* (2014.01)
*G06T 3/00* (2006.01)
*H04N 19/597* (2014.01)
*H04N 19/105* (2014.01)
*H04N 13/161* (2018.01)

(52) U.S. Cl.
CPC ....... *H04N 5/23238* (2013.01); *H04N 13/161* (2018.05); *H04N 19/105* (2014.11); *H04N 19/159* (2014.11); *H04N 19/172* (2014.11); *H04N 19/597* (2014.11)

(56) References Cited

U.S. PATENT DOCUMENTS

| | | |
|---|---|---|
| 5,262,777 A | 11/1993 | Low et al. |
| 5,313,306 A | 5/1994 | Kuban et al. |
| 5,359,363 A | 10/1994 | Kuban et al. |
| 5,448,687 A | 9/1995 | Hoogerhyde et al. |
| 5,537,155 A | 7/1996 | O'Connell et al. |
| 5,600,346 A | 2/1997 | Kamata et al. |
| 5,684,937 A | 11/1997 | Oxaal |
| 5,689,800 A | 11/1997 | Downs |
| 5,715,016 A | 2/1998 | Kobayashi et al. |
| 5,787,207 A | 7/1998 | Golin |
| 5,872,604 A | 2/1999 | Ogura |
| 5,903,270 A | 5/1999 | Gentry et al. |
| 5,936,630 A | 8/1999 | Oxaal |
| 6,011,897 A * | 1/2000 | Koyama ............... G11B 20/12 375/E7.027 |
| 6,031,540 A | 2/2000 | Golin et al. |
| 6,043,837 A | 3/2000 | Driscoll et al. |
| 6,058,212 A | 5/2000 | Yokoyama |
| 6,122,317 A | 9/2000 | Hanami et al. |
| 6,144,890 A | 11/2000 | Rothkop |
| 6,204,854 B1 | 3/2001 | Signes et al. |
| 6,219,089 B1 | 4/2001 | Driscoll, Jr. et al. |
| 6,222,883 B1 | 4/2001 | Murdock et al. |
| 6,317,159 B1 * | 11/2001 | Aoyama ............... G09G 5/005 348/441 |
| 6,331,869 B1 | 12/2001 | Furlan et al. |
| 6,426,774 B1 | 7/2002 | Driscoll, Jr. et al. |
| 6,535,643 B1 | 3/2003 | Hong |
| 6,539,060 B1 | 3/2003 | Lee et al. |
| 6,559,853 B1 | 5/2003 | Hashimoto et al. |
| 6,577,335 B2 | 6/2003 | Kobayashi et al. |
| 6,751,347 B2 | 6/2004 | Pettigrew et al. |
| 6,762,789 B1 | 7/2004 | Sogabe et al. |
| 6,769,131 B1 | 7/2004 | Tanaka et al. |
| 6,795,113 B1 | 9/2004 | Jackson et al. |
| 6,907,310 B2 | 6/2005 | Gardner et al. |
| 6,973,130 B1 | 12/2005 | Wee et al. |
| 6,993,201 B1 | 1/2006 | Haskell et al. |
| 7,006,707 B2 | 2/2006 | Peterson |
| 7,015,954 B1 | 3/2006 | Foote et al. |
| 7,039,113 B2 | 5/2006 | Soundararajan |
| 7,050,085 B1 | 5/2006 | Park et al. |
| 7,095,905 B1 | 8/2006 | Peterson |
| 7,123,777 B2 | 10/2006 | Rondinelli et al. |
| 7,139,440 B2 | 11/2006 | Rondinelli et al. |
| 7,149,549 B1 | 12/2006 | Ortiz et al. |
| 7,259,760 B1 | 8/2007 | Hashimoto et al. |
| 7,327,787 B1 | 2/2008 | Chen et al. |
| 7,382,399 B1 | 6/2008 | McCall et al. |
| 7,385,995 B2 | 6/2008 | Stiscia et al. |
| 7,415,356 B1 | 8/2008 | Gowda et al. |
| 7,433,535 B2 | 10/2008 | Mukherjee et al. |
| 7,450,749 B2 | 11/2008 | Rouet et al. |
| 7,593,041 B2 | 9/2009 | Novak et al. |
| 7,660,245 B1 | 2/2010 | Luby |
| 7,742,073 B1 | 6/2010 | Cohen-Solal et al. |
| 7,755,667 B2 | 7/2010 | Rabbani et al. |
| 7,782,357 B2 | 8/2010 | Cutler |
| 8,027,473 B2 | 9/2011 | Stiscia et al. |
| 8,045,615 B2 | 10/2011 | Liang et al. |
| 8,217,956 B1 | 7/2012 | Jin |
| 8,255,552 B2 | 8/2012 | Witt et al. |
| 8,270,496 B2 | 9/2012 | Yin et al. |
| 8,295,360 B1 | 10/2012 | Lewis et al. |
| 8,339,394 B1 | 12/2012 | Lininger |
| 8,442,109 B2 | 5/2013 | Wang et al. |
| 8,442,311 B1 | 5/2013 | Hobbs et al. |
| 8,462,109 B2 | 6/2013 | Nasiri et al. |
| 8,462,853 B2 | 6/2013 | Jeon et al. |
| 8,482,595 B2 | 7/2013 | Kweon |
| 8,682,091 B2 | 3/2014 | Amit et al. |
| 8,693,537 B2 | 4/2014 | Wang et al. |
| 8,711,941 B2 | 4/2014 | Letunovskiy et al. |
| 9,013,536 B2 | 4/2015 | Zhu et al. |
| 9,071,484 B1 | 6/2015 | Traux |
| 9,094,681 B1 | 7/2015 | Wilkins et al. |
| 9,098,870 B2 | 8/2015 | Meadow et al. |
| 9,219,919 B2 | 12/2015 | Deshpande |
| 9,224,247 B2 | 12/2015 | Wada et al. |
| 9,258,520 B2 | 2/2016 | Lee |
| 9,277,122 B1 | 3/2016 | Imura et al. |
| 9,404,764 B2 | 8/2016 | Lynch |
| 9,430,873 B2 | 8/2016 | Nakamura et al. |
| 9,510,007 B2 | 11/2016 | Chan et al. |
| 9,516,225 B2 | 12/2016 | Banta et al. |
| 9,596,899 B2 | 3/2017 | Stahl et al. |
| 9,639,935 B1 | 5/2017 | Douady-Pleven et al. |
| 9,723,223 B1 | 8/2017 | Banta et al. |
| 9,743,060 B1 | 8/2017 | Matias et al. |
| 9,754,413 B1 | 9/2017 | Gray |
| 9,781,356 B1 | 10/2017 | Banta et al. |
| 9,838,687 B1 | 12/2017 | Banta et al. |
| 9,866,815 B2 | 1/2018 | Vrcelj et al. |
| 9,936,204 B1 | 4/2018 | Sim et al. |
| 9,967,563 B2 | 5/2018 | Hsu et al. |
| 9,967,577 B2 | 5/2018 | Wu et al. |
| 9,992,502 B2 | 6/2018 | Abbas et al. |
| 9,996,945 B1 | 6/2018 | Holzer et al. |
| 10,102,611 B1 | 10/2018 | Murtha et al. |
| 10,204,658 B2 | 2/2019 | Krishnan |
| 10,212,456 B2 | 2/2019 | Guo et al. |
| 10,282,814 B2 | 5/2019 | Lin et al. |
| 10,306,186 B2 | 5/2019 | Chuang et al. |
| 10,321,109 B1 | 6/2019 | Tanumihardja et al. |
| 10,339,627 B2 | 7/2019 | Abbas et al. |
| 10,339,688 B2 | 7/2019 | Su et al. |
| 10,349,068 B1 | 7/2019 | Banta et al. |
| 10,375,371 B2 | 8/2019 | Xu et al. |
| 10,455,238 B2 | 10/2019 | Mody et al. |
| 10,523,913 B2 | 12/2019 | Kim et al. |
| 10,559,121 B1 | 2/2020 | Moudgil et al. |
| 10,573,060 B1 | 2/2020 | Ascolese et al. |
| 10,574,997 B2 | 2/2020 | Chung et al. |
| 2001/0006376 A1 | 7/2001 | Numa et al. |
| 2001/0028735 A1 | 10/2001 | Pettigrew et al. |
| 2001/0036303 A1 | 11/2001 | Maurincomme et al. |
| 2002/0080878 A1 | 6/2002 | Li |
| 2002/0093670 A1 | 7/2002 | Luo et al. |
| 2002/0126129 A1 | 9/2002 | Snyder et al. |
| 2002/0140702 A1 | 10/2002 | Koller et al. |
| 2002/0141498 A1 | 10/2002 | Martins |
| 2002/0190980 A1 | 12/2002 | Gerritsen et al. |
| 2002/0196330 A1 | 12/2002 | Park et al. |
| 2003/0098868 A1 | 5/2003 | Fujiwara et al. |
| 2003/0099294 A1 | 5/2003 | Wang et al. |
| 2003/0152146 A1 | 8/2003 | Lin et al. |
| 2004/0022322 A1 | 2/2004 | Dye |
| 2004/0028133 A1 | 2/2004 | Subramaniyan et al. |
| 2004/0028134 A1 | 2/2004 | Subramaniyan et al. |
| 2004/0032906 A1 | 2/2004 | Lillig et al. |
| 2004/0056900 A1 | 3/2004 | Blume |
| 2004/0189675 A1 | 9/2004 | Pretlove et al. |
| 2004/0201608 A1 | 10/2004 | Ma et al. |
| 2004/0218099 A1 | 11/2004 | Washington |
| 2004/0227766 A1 | 11/2004 | Chou et al. |
| 2004/0247173 A1 | 12/2004 | Nielsen et al. |
| 2005/0013498 A1 | 1/2005 | Srinivasan et al. |

(56) References Cited

U.S. PATENT DOCUMENTS

| | | |
|---|---|---|
| 2005/0041023 A1 | 2/2005 | Green |
| 2005/0069682 A1 | 3/2005 | Tseng |
| 2005/0129124 A1 | 6/2005 | Ha |
| 2005/0204113 A1 | 9/2005 | Harper et al. |
| 2005/0243915 A1 | 11/2005 | Kwon et al. |
| 2005/0244063 A1 | 11/2005 | Kwon et al. |
| 2006/0034527 A1 | 2/2006 | Gritsevich |
| 2006/0055699 A1 | 3/2006 | Perlman et al. |
| 2006/0055706 A1 | 3/2006 | Perlman et al. |
| 2006/0119599 A1 | 6/2006 | Woodbury |
| 2006/0126719 A1 | 6/2006 | Wilensky |
| 2006/0132482 A1 | 6/2006 | Oh |
| 2006/0165164 A1 | 7/2006 | Kwan et al. |
| 2006/0165181 A1 | 7/2006 | Kwan et al. |
| 2006/0204043 A1 | 9/2006 | Takei |
| 2006/0238445 A1 | 10/2006 | Wang et al. |
| 2006/0282855 A1 | 12/2006 | Margulis |
| 2007/0024705 A1 | 2/2007 | Richter et al. |
| 2007/0057943 A1 | 3/2007 | Beda et al. |
| 2007/0064120 A1 | 3/2007 | Didow et al. |
| 2007/0071100 A1 | 3/2007 | Shi et al. |
| 2007/0097268 A1 | 5/2007 | Relan et al. |
| 2007/0115841 A1 | 5/2007 | Taubman et al. |
| 2007/0223582 A1 | 9/2007 | Borer |
| 2007/0263722 A1 | 11/2007 | Fukuzawa |
| 2007/0291143 A1 | 12/2007 | Barbieri et al. |
| 2008/0036875 A1 | 2/2008 | Jones et al. |
| 2008/0044104 A1 | 2/2008 | Gering |
| 2008/0049991 A1 | 2/2008 | Gering |
| 2008/0077953 A1 | 3/2008 | Fernandez et al. |
| 2008/0118180 A1 | 5/2008 | Kamiya et al. |
| 2008/0184128 A1 | 7/2008 | Swenson et al. |
| 2008/0252717 A1 | 10/2008 | Moon et al. |
| 2008/0310513 A1 | 12/2008 | Ma et al. |
| 2009/0040224 A1 | 2/2009 | Igarashi et al. |
| 2009/0123088 A1 | 5/2009 | Kallay et al. |
| 2009/0153577 A1 | 6/2009 | Ghyme et al. |
| 2009/0190858 A1 | 7/2009 | Moody et al. |
| 2009/0219280 A1 | 9/2009 | Maillot |
| 2009/0219281 A1 | 9/2009 | Maillot |
| 2009/0251530 A1 | 10/2009 | Cilia |
| 2009/0262838 A1 | 10/2009 | Gholmieh et al. |
| 2010/0029339 A1 | 2/2010 | Kim et al. |
| 2010/0079605 A1 | 4/2010 | Wang et al. |
| 2010/0080287 A1 | 4/2010 | Ali |
| 2010/0110481 A1 | 5/2010 | Do et al. |
| 2010/0124274 A1 | 5/2010 | Cheok et al. |
| 2010/0215226 A1 | 8/2010 | Kaufman et al. |
| 2010/0305909 A1 | 12/2010 | Wolper et al. |
| 2010/0316129 A1 | 12/2010 | Zhao et al. |
| 2010/0329361 A1 | 12/2010 | Choi et al. |
| 2010/0329362 A1 | 12/2010 | Choi et al. |
| 2011/0058055 A1 | 3/2011 | Lindahl et al. |
| 2011/0128350 A1 | 6/2011 | Oliver et al. |
| 2011/0142306 A1 | 6/2011 | Nair |
| 2011/0200100 A1 | 8/2011 | Kim et al. |
| 2011/0235706 A1 | 9/2011 | Demircin et al. |
| 2011/0305274 A1 | 12/2011 | Fu et al. |
| 2011/0310089 A1 | 12/2011 | Petersen |
| 2012/0082232 A1 | 4/2012 | Rojals et al. |
| 2012/0098926 A1 | 4/2012 | Kweon |
| 2012/0192115 A1 | 7/2012 | Falchuk et al. |
| 2012/0219055 A1 | 8/2012 | He et al. |
| 2012/0260217 A1 | 10/2012 | Celebisoy |
| 2012/0263231 A1 | 10/2012 | Zhou |
| 2012/0307746 A1 | 12/2012 | Hammerschmidt et al. |
| 2012/0320984 A1 | 12/2012 | Zhou |
| 2012/0327172 A1 | 12/2012 | El-Saban et al. |
| 2013/0003858 A1 | 1/2013 | Sze |
| 2013/0016783 A1 | 1/2013 | Kim et al. |
| 2013/0044108 A1 | 2/2013 | Tanaka et al. |
| 2013/0051452 A1 | 2/2013 | Li et al. |
| 2013/0088491 A1 | 4/2013 | Hobbs et al. |
| 2013/0094568 A1 | 4/2013 | Hsu et al. |
| 2013/0101025 A1 | 4/2013 | Van der Auwera et al. |
| 2013/0101042 A1 | 4/2013 | Sugio et al. |
| 2013/0111399 A1 | 5/2013 | Rose |
| 2013/0124156 A1 | 5/2013 | Wolper et al. |
| 2013/0127844 A1 | 5/2013 | Koeppel et al. |
| 2013/0128986 A1 | 5/2013 | Tsai et al. |
| 2013/0136174 A1 | 5/2013 | Xu et al. |
| 2013/0170726 A1 | 7/2013 | Kaufman et al. |
| 2013/0182775 A1 | 7/2013 | Wang et al. |
| 2013/0195183 A1 | 8/2013 | Zhai et al. |
| 2013/0208787 A1 | 8/2013 | Zheng et al. |
| 2013/0219012 A1 | 8/2013 | Suresh et al. |
| 2013/0251028 A1 | 9/2013 | Au et al. |
| 2013/0301706 A1 | 11/2013 | Qiu et al. |
| 2014/0002439 A1 | 1/2014 | Lynch |
| 2014/0003450 A1 | 1/2014 | Bentley et al. |
| 2014/0010293 A1 | 1/2014 | Srinivasan et al. |
| 2014/0078263 A1 | 3/2014 | Kim |
| 2014/0082054 A1 | 3/2014 | Denoual et al. |
| 2014/0089326 A1 | 3/2014 | Lin et al. |
| 2014/0140401 A1 | 5/2014 | Lee et al. |
| 2014/0153636 A1 | 6/2014 | Esenlik et al. |
| 2014/0169469 A1 | 6/2014 | Bernal et al. |
| 2014/0176542 A1 | 6/2014 | Shohara et al. |
| 2014/0218356 A1 | 8/2014 | Distler et al. |
| 2014/0254949 A1 | 9/2014 | Chou |
| 2014/0267235 A1 | 9/2014 | DeJohn et al. |
| 2014/0269899 A1 | 9/2014 | Park et al. |
| 2014/0286410 A1 | 9/2014 | Zenkich |
| 2014/0355667 A1 | 12/2014 | Lei et al. |
| 2014/0368669 A1 | 12/2014 | Talvala et al. |
| 2014/0376634 A1 | 12/2014 | Guo et al. |
| 2015/0003525 A1 | 1/2015 | Sasai et al. |
| 2015/0003725 A1 | 1/2015 | Wan |
| 2015/0016522 A1 | 1/2015 | Sato |
| 2015/0029294 A1 | 1/2015 | Lin et al. |
| 2015/0062292 A1 | 3/2015 | Kweon |
| 2015/0089348 A1 | 3/2015 | Jose |
| 2015/0103884 A1 | 4/2015 | Ramasubramonian et al. |
| 2015/0145966 A1 | 5/2015 | Krieger et al. |
| 2015/0195491 A1 | 7/2015 | Shaburov et al. |
| 2015/0195559 A1 | 7/2015 | Chen et al. |
| 2015/0237370 A1 | 8/2015 | Zhou et al. |
| 2015/0256839 A1 | 9/2015 | Ueki et al. |
| 2015/0264259 A1 | 9/2015 | Raghoebardajal et al. |
| 2015/0264386 A1 | 9/2015 | Pang et al. |
| 2015/0264404 A1 | 9/2015 | Hannuksela |
| 2015/0271517 A1 | 9/2015 | Pang et al. |
| 2015/0279087 A1 | 10/2015 | Myers et al. |
| 2015/0279121 A1 | 10/2015 | Myers et al. |
| 2015/0304665 A1 | 10/2015 | Hannuksela et al. |
| 2015/0321103 A1 | 11/2015 | Barnett et al. |
| 2015/0326865 A1 | 11/2015 | Yin et al. |
| 2015/0339853 A1 | 11/2015 | Wolper et al. |
| 2015/0341552 A1 | 11/2015 | Chen et al. |
| 2015/0346812 A1 | 12/2015 | Cole et al. |
| 2015/0350673 A1 | 12/2015 | Hu et al. |
| 2015/0351477 A1 | 12/2015 | Stahl et al. |
| 2015/0358612 A1 | 12/2015 | Sandrew et al. |
| 2015/0358613 A1 | 12/2015 | Sandrew et al. |
| 2015/0358633 A1 | 12/2015 | Choi et al. |
| 2015/0373334 A1 | 12/2015 | Rapaka et al. |
| 2015/0373372 A1 | 12/2015 | He et al. |
| 2016/0012855 A1* | 1/2016 | Krishnan ............ G11B 27/105 386/241 |
| 2016/0014422 A1 | 1/2016 | Su et al. |
| 2016/0027187 A1 | 1/2016 | Wang et al. |
| 2016/0050369 A1 | 2/2016 | Takenaka et al. |
| 2016/0080753 A1 | 3/2016 | Oh |
| 2016/0112489 A1 | 4/2016 | Adams et al. |
| 2016/0112704 A1 | 4/2016 | Grange et al. |
| 2016/0142697 A1* | 5/2016 | Budagavi ............ H04N 19/117 348/43 |
| 2016/0150231 A1 | 5/2016 | Schulze |
| 2016/0165257 A1 | 6/2016 | Chen et al. |
| 2016/0227214 A1 | 8/2016 | Rapaka et al. |
| 2016/0234438 A1 | 8/2016 | Satoh |
| 2016/0241836 A1 | 8/2016 | Cole et al. |
| 2016/0269632 A1 | 9/2016 | Morioka |
| 2016/0277746 A1 | 9/2016 | Fu et al. |

(56) References Cited

U.S. PATENT DOCUMENTS

| | | |
|---|---|---|
| 2016/0286119 A1 | 9/2016 | Rondinelli |
| 2016/0350585 A1 | 12/2016 | Lin et al. |
| 2016/0350592 A1 | 12/2016 | Ma et al. |
| 2016/0352791 A1 | 12/2016 | Adams et al. |
| 2016/0352971 A1 | 12/2016 | Adams et al. |
| 2016/0353089 A1 | 12/2016 | Gallup et al. |
| 2016/0353146 A1 | 12/2016 | Weaver et al. |
| 2016/0360104 A1 | 12/2016 | Zhang et al. |
| 2016/0360180 A1 | 12/2016 | Cole et al. |
| 2017/0013279 A1 | 1/2017 | Puri et al. |
| 2017/0026659 A1* | 1/2017 | Lin ............... H04N 19/597 |
| 2017/0038942 A1 | 2/2017 | Rosenfeld et al. |
| 2017/0054907 A1 | 2/2017 | Nishihara et al. |
| 2017/0064199 A1 | 3/2017 | Lee et al. |
| 2017/0078447 A1 | 3/2017 | Hancock et al. |
| 2017/0085892 A1 | 3/2017 | Liu et al. |
| 2017/0094184 A1 | 3/2017 | Gao et al. |
| 2017/0104927 A1 | 4/2017 | Mugavero et al. |
| 2017/0109930 A1 | 4/2017 | Holzer et al. |
| 2017/0127008 A1 | 5/2017 | Kankaanpaa et al. |
| 2017/0142371 A1 | 5/2017 | Barzuza et al. |
| 2017/0155912 A1 | 6/2017 | Thomas et al. |
| 2017/0180635 A1 | 6/2017 | Hayashi et al. |
| 2017/0200255 A1 | 7/2017 | Lin et al. |
| 2017/0200315 A1 | 7/2017 | Lockhart |
| 2017/0214937 A1 | 7/2017 | Lin et al. |
| 2017/0223268 A1 | 8/2017 | Shimmoto |
| 2017/0223368 A1 | 8/2017 | Abbas et al. |
| 2017/0228867 A1 | 8/2017 | Baruch |
| 2017/0230668 A1 | 8/2017 | Lin et al. |
| 2017/0236323 A1 | 8/2017 | Lim et al. |
| 2017/0244775 A1* | 8/2017 | Ha ..................... G06T 19/006 |
| 2017/0251208 A1 | 8/2017 | Adsumilli et al. |
| 2017/0257644 A1 | 9/2017 | Andersson et al. |
| 2017/0272698 A1 | 9/2017 | Liu et al. |
| 2017/0278262 A1 | 9/2017 | Kawamoto et al. |
| 2017/0280126 A1* | 9/2017 | Van der Auwera ............... H04N 13/0048 |
| 2017/0287200 A1 | 10/2017 | Forutanpour et al. |
| 2017/0287220 A1 | 10/2017 | Khalid et al. |
| 2017/0295356 A1 | 10/2017 | Abbas et al. |
| 2017/0301065 A1 | 10/2017 | Adsumilli et al. |
| 2017/0301132 A1 | 10/2017 | Dalton et al. |
| 2017/0302714 A1 | 10/2017 | Ramsay et al. |
| 2017/0302951 A1 | 10/2017 | Joshi et al. |
| 2017/0309143 A1 | 10/2017 | Trani et al. |
| 2017/0322635 A1 | 11/2017 | Yoon et al. |
| 2017/0323422 A1 | 11/2017 | Kim et al. |
| 2017/0323423 A1 | 11/2017 | Lin et al. |
| 2017/0332107 A1 | 11/2017 | Abbas et al. |
| 2017/0336705 A1* | 11/2017 | Zhou ..................... G06T 3/0062 |
| 2017/0339324 A1 | 11/2017 | Tocher et al. |
| 2017/0339341 A1 | 11/2017 | Zhou et al. |
| 2017/0339391 A1 | 11/2017 | Zhou et al. |
| 2017/0339392 A1* | 11/2017 | Forutanpour ........ H04N 13/161 |
| 2017/0339415 A1* | 11/2017 | Wang ................... H04N 19/167 |
| 2017/0344843 A1* | 11/2017 | Wang ................... H04N 21/2353 |
| 2017/0353737 A1 | 12/2017 | Lin et al. |
| 2017/0359590 A1 | 12/2017 | Zhang et al. |
| 2017/0366808 A1 | 12/2017 | Lin et al. |
| 2017/0374332 A1 | 12/2017 | Yamaguchi et al. |
| 2017/0374375 A1 | 12/2017 | Makar et al. |
| 2018/0005447 A1 | 1/2018 | Wallner et al. |
| 2018/0005449 A1 | 1/2018 | Wallner et al. |
| 2018/0007387 A1 | 1/2018 | Izumi |
| 2018/0007389 A1* | 1/2018 | Izumi ................... H04N 21/2343 |
| 2018/0018807 A1 | 1/2018 | Lu et al. |
| 2018/0020202 A1 | 1/2018 | Xu et al. |
| 2018/0020238 A1 | 1/2018 | Liu et al. |
| 2018/0027178 A1 | 1/2018 | MacMillan et al. |
| 2018/0027226 A1 | 1/2018 | Abbas et al. |
| 2018/0027257 A1* | 1/2018 | Izumi ..................... G06T 9/00 386/328 |
| 2018/0047208 A1 | 2/2018 | Marin et al. |
| 2018/0048890 A1 | 2/2018 | Kim et al. |
| 2018/0053280 A1 | 2/2018 | Kim et al. |
| 2018/0054613 A1 | 2/2018 | Lin et al. |
| 2018/0061002 A1 | 3/2018 | Lee et al. |
| 2018/0063505 A1 | 3/2018 | Lee et al. |
| 2018/0063544 A1 | 3/2018 | Tourapis et al. |
| 2018/0075576 A1 | 3/2018 | Liu et al. |
| 2018/0075604 A1 | 3/2018 | Kim et al. |
| 2018/0075635 A1 | 3/2018 | Choi et al. |
| 2018/0077451 A1 | 3/2018 | Yip et al. |
| 2018/0084257 A1* | 3/2018 | Abbas ................... H04N 19/176 |
| 2018/0091812 A1 | 3/2018 | Guo et al. |
| 2018/0098090 A1 | 4/2018 | Lin et al. |
| 2018/0101931 A1 | 4/2018 | Abbas et al. |
| 2018/0109810 A1 | 4/2018 | Xu et al. |
| 2018/0130243 A1 | 5/2018 | Kim et al. |
| 2018/0130264 A1 | 5/2018 | Ebacher |
| 2018/0146136 A1 | 5/2018 | Yamamoto |
| 2018/0146138 A1 | 5/2018 | Jeon et al. |
| 2018/0152636 A1 | 5/2018 | Yim et al. |
| 2018/0152663 A1 | 5/2018 | Wozniak et al. |
| 2018/0160138 A1 | 6/2018 | Park |
| 2018/0160156 A1 | 6/2018 | Hannuksela et al. |
| 2018/0164593 A1 | 6/2018 | Van Der Auwera et al. |
| 2018/0167613 A1 | 6/2018 | Hannuksela et al. |
| 2018/0167634 A1 | 6/2018 | Salmimaa et al. |
| 2018/0174619 A1 | 6/2018 | Roy et al. |
| 2018/0176468 A1 | 6/2018 | Wang et al. |
| 2018/0176536 A1 | 6/2018 | Jo et al. |
| 2018/0184101 A1 | 6/2018 | Ho |
| 2018/0184121 A1 | 6/2018 | Kim et al. |
| 2018/0191787 A1 | 7/2018 | Morita et al. |
| 2018/0192074 A1 | 7/2018 | Shih et al. |
| 2018/0199029 A1 | 7/2018 | Van Der Auwera et al. |
| 2018/0199034 A1 | 7/2018 | Nam et al. |
| 2018/0199070 A1 | 7/2018 | Wang |
| 2018/0218512 A1* | 8/2018 | Chan ..................... H04N 19/122 |
| 2018/0227484 A1 | 8/2018 | Hung et al. |
| 2018/0234700 A1 | 8/2018 | Kim et al. |
| 2018/0240223 A1 | 8/2018 | Yi et al. |
| 2018/0240276 A1 | 8/2018 | He et al. |
| 2018/0242016 A1 | 8/2018 | Lee et al. |
| 2018/0242017 A1 | 8/2018 | Van Leuven et al. |
| 2018/0249076 A1 | 8/2018 | Sheng et al. |
| 2018/0249163 A1 | 8/2018 | Curcio et al. |
| 2018/0249164 A1 | 8/2018 | Kim et al. |
| 2018/0253879 A1 | 9/2018 | Li et al. |
| 2018/0268517 A1 | 9/2018 | Coban et al. |
| 2018/0270417 A1 | 9/2018 | Suitoh et al. |
| 2018/0276789 A1 | 9/2018 | Van Der Auwera et al. |
| 2018/0276826 A1 | 9/2018 | Van Der Auwera et al. |
| 2018/0276890 A1 | 9/2018 | Wang |
| 2018/0288435 A1* | 10/2018 | Boyce .................. H04N 19/105 |
| 2018/0295282 A1* | 10/2018 | Boyce .................. H04L 65/4092 |
| 2018/0302621 A1 | 10/2018 | Fu et al. |
| 2018/0307398 A1 | 10/2018 | Kim et al. |
| 2018/0315245 A1 | 11/2018 | Patel |
| 2018/0322611 A1 | 11/2018 | Bang et al. |
| 2018/0329482 A1 | 11/2018 | Woo et al. |
| 2018/0332265 A1 | 11/2018 | Hwang et al. |
| 2018/0332279 A1* | 11/2018 | Kang ..................... H04N 19/50 |
| 2018/0343388 A1 | 11/2018 | Matsushita |
| 2018/0349705 A1 | 12/2018 | Kim et al. |
| 2018/0350407 A1 | 12/2018 | Decoodt et al. |
| 2018/0352225 A1 | 12/2018 | Guo et al. |
| 2018/0352259 A1 | 12/2018 | Guo et al. |
| 2018/0352264 A1 | 12/2018 | Guo et al. |
| 2018/0359487 A1 | 12/2018 | Bang et al. |
| 2018/0374192 A1 | 12/2018 | Kunkel et al. |
| 2018/0376126 A1 | 12/2018 | Hannuksela |
| 2018/0376152 A1 | 12/2018 | Wang et al. |
| 2019/0004414 A1 | 1/2019 | Kim et al. |
| 2019/0007669 A1 | 1/2019 | Kim et al. |
| 2019/0007679 A1 | 1/2019 | Coban et al. |
| 2019/0007684 A1 | 1/2019 | Van Der Auwera et al. |
| 2019/0012766 A1 | 1/2019 | Yoshimi |
| 2019/0014304 A1 | 1/2019 | Curcio et al. |
| 2019/0026956 A1 | 1/2019 | Gausebeck et al. |
| 2019/0028642 A1 | 1/2019 | Fujita et al. |
| 2019/0045212 A1 | 2/2019 | Rose et al. |

(56) References Cited

U.S. PATENT DOCUMENTS

| | | |
|---|---|---|
| 2019/0057487 A1 | 2/2019 | Cheng |
| 2019/0057496 A1 | 2/2019 | Ogawa et al. |
| 2019/0082184 A1 | 3/2019 | Hannuksela |
| 2019/0104315 A1 | 4/2019 | Guo et al. |
| 2019/0108611 A1 | 4/2019 | Izumi |
| 2019/0132521 A1 | 5/2019 | Fujita et al. |
| 2019/0132594 A1 | 5/2019 | Chung et al. |
| 2019/0200016 A1 | 6/2019 | Jang et al. |
| 2019/0215512 A1 | 7/2019 | Lee et al. |
| 2019/0215532 A1 | 7/2019 | He et al. |
| 2019/0230377 A1 | 7/2019 | Ma et al. |
| 2019/0236990 A1 | 8/2019 | Song et al. |
| 2019/0246141 A1 | 8/2019 | Kim et al. |
| 2019/0253622 A1 | 8/2019 | Van der Auwera et al. |
| 2019/0268594 A1 | 8/2019 | Lim et al. |
| 2019/0273929 A1 | 9/2019 | Ma et al. |
| 2019/0273949 A1 | 9/2019 | Kim et al. |
| 2019/0281290 A1 | 9/2019 | Lee et al. |
| 2019/0289324 A1 | 9/2019 | Budagavi |
| 2019/0289331 A1 | 9/2019 | Byun |
| 2019/0306515 A1 | 10/2019 | Shima |
| 2020/0029077 A1 | 1/2020 | Lee et al. |
| 2020/0036976 A1 | 1/2020 | Kanoh et al. |
| 2020/0074687 A1 | 3/2020 | Lin et al. |
| 2020/0077092 A1 | 3/2020 | Lin et al. |

FOREIGN PATENT DOCUMENTS

| | | |
|---|---|---|
| WO | WO 2015/138979 A2 | 9/2015 |
| WO | WO 2016/076680 A1 | 5/2016 |
| WO | WO 2016/140060 A1 | 9/2016 |
| WO | WO 2017/125030 A1 | 7/2017 |
| WO | WO 2017/127816 A1 | 7/2017 |

OTHER PUBLICATIONS

He et al.; "AHG8: InterDigital's projection format conversion tool"; Joint Video Exploration Team (JVET) of ITU-T SG 16 WP3 and ISO/IEC JTC 1/SC 29/WG 11 $4^{th}$meeting; Oct. 2016; 18 pages.

Kammachi et al.; "AHG8: Test results for viewport-dependent pyramid, cube map, and equirectangular panorama schemes"; JVET-D00078; Oct. 2016; 7 pages.

Yip et al.; "Technologies under Considerations for ISO/IEC 23000-20 Omnidirectional Media Application Format"; ISO/IEC JTC1/SC29/WG11 MPEG2017/W16637; Jan. 2017; 50 pages.

International Patent Application No. PCT/US2018/018246; Int'l Search Report and the Written Opinion; dated Apr. 20, 2018; 15 pages.

Tosic et al.; "Multiresolution Motion Estimation for Omnidirectional Images"; IEEE $13^{th}$European Signal Processing Conference; Sep. 2005; 4 pages.

He et al.; "AHG8: Geometry padding for 360 video coding"; Joint Video Exploration Team (JVET); Document: JVET-D0075; Oct. 2016; 10 pages.

Vishwanath et al.; "Rotational Motion Model for Temporal Prediction in 360 Video Coding"; IEEE $19^{th}$Int'l Workshop on Multimedia Signal Processing; Oct. 2017; 6 pages.

Sauer et al.; "Improved Motion Compensation for 360 Video Projected to Polytopes" Proceedings of the IEEE Int'l Conf. On Multimedia and Expo; Jul. 2017; pp. 61-66.

International Patent Application No. PCT/US2018/017124; Int'l Search Report and the Written Opinion; dated Apr. 30, 2018; 19 pages.

Boyce et al.; "Common Test Conditions and Evaluation Procedures for 360 degree Video Coding"; Joint Video Exploration Team; ITU-T SG 16 WP 3 and ISO/IEC JTC 1/SC 29/WG 11; Doc. JVET-D1030; Oct. 2016; 6 pages.

390 Li et al.; "Projection Based Advanced Motion Model for Cubic Mapping for 360-Degree Video"; Cornell University Library; 2017; 5 pages.

Zheng et al.; "Adaptive Selection of Motion Models for Panoramic Video Coding"; IEEE Int'l Conf. Multimedia and Expo; Jul. 2007; pp. 1319-1322.

He et al.; "AHG8: Algorithm description of InterDigital's projection format conversion tool (PCT360)"; Joint Video Exploration Team; ITU-T SG 16 WP 3 and ISO/IEC JTC 1/SC 29/WG 11; Doc. JVET-D0090; Oct. 2016; 6 pages.

International Patent Application No. PCT/US2017/051542; Int'l Search Report and the Written Opinion; dated Dec. 7, 2017; 17 pages.

International Patent Application No. PCT/US2017/051542; Int'l Preliminary Report on Patentability; dated Jul. 4, 2019; 10 pages.

International Patent Application No. PCT/US2018/018246; Int'l Preliminary Report on Patentability; dated Sep. 6, 2019; 8 pages.

International Patent Application No. PCT/US2018/017124; Int'l Preliminary Report on Patentability; dated Aug. 29, 2019; 12 pages.

\* cited by examiner

100

200

300

400

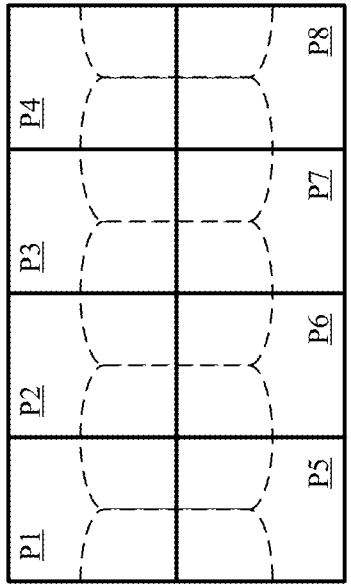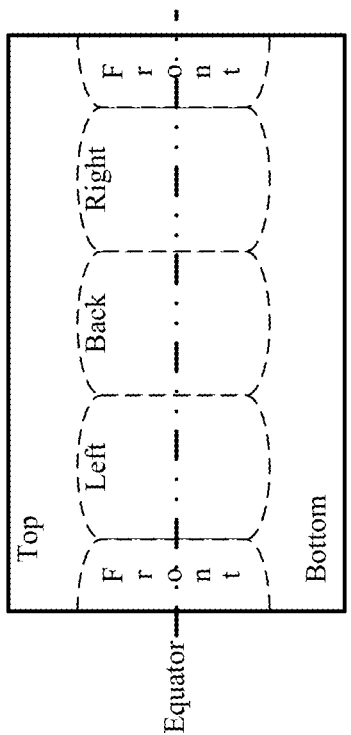
FIG. 5
500

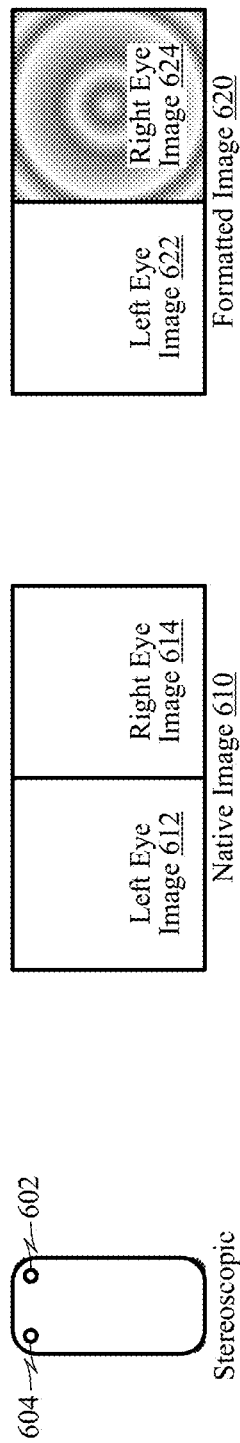
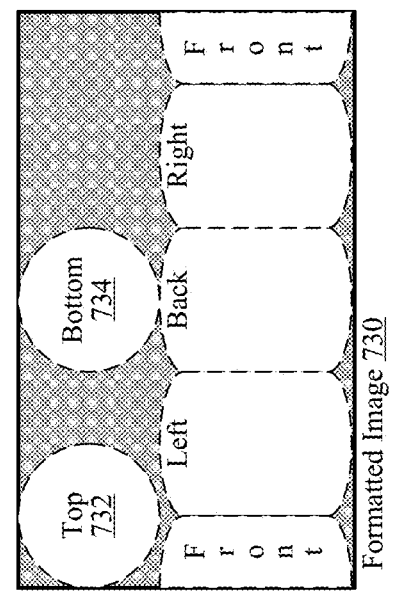
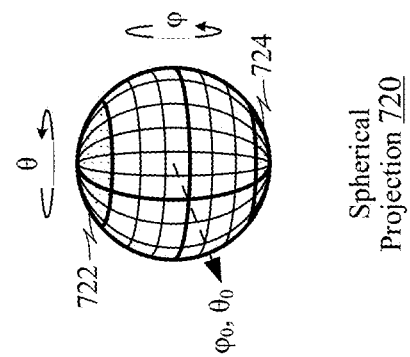
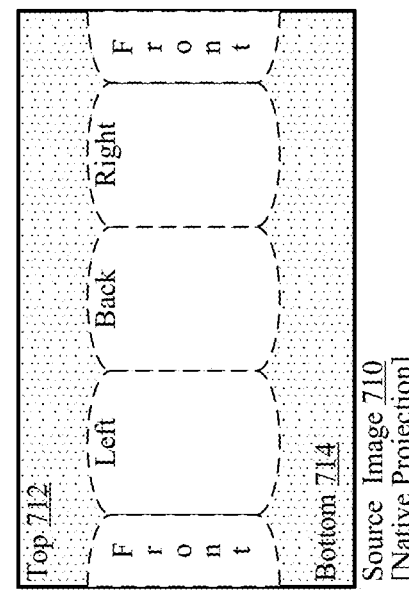
FIG. 6
600
FIG. 7
700

800

900

1100

1200

1300

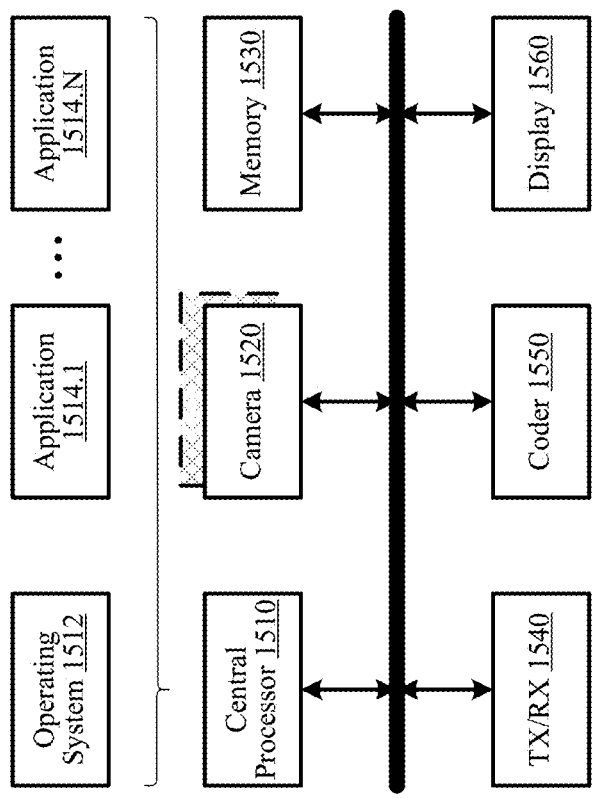

ADAPTIVE RESOLUTION AND PROJECTION FORMAT IN MULTI-DIRECTION VIDEO

BACKGROUND

The present disclosure relates to coding/decoding systems for multi-directional imaging system and, in particular, to use of coding techniques that originally were developed for flat images, for multi-directional image data.

In multi-directional imaging, a two-dimensional image represents image content taken from multiple fields of view. Omnidirectional imaging is one type of multi-directional imaging where a single image represents content viewable from a single vantage point in all directions—360° horizontally about the vantage point and 360° vertically about the vantage point. Other multi-directional images may capture data in fields of view that are not fully 360°.

Modern coding protocols tend to be inefficient when coding multi-directional images. Multi-directional images tend to allocate real estate within the images to the different fields of view essentially in a fixed manner. For example, in many multi-directional imaging formats, different fields of view may be allocated space in the multi-directional image equally. Some other multi-directional imaging formats allocate space unequally but in a fixed manner. And, many applications that consume multi-directional imaging tend to use only a portion of the multi-directional image during rendering, which causes resources spent to code un-used portions of the multi-directional image to be wasted.

Accordingly, the inventors recognized a need to improve coding systems to increase efficiency of multi-directional image data.

BRIEF DESCRIPTION OF THE DRAWINGS

FIG. 5 illustrates exemplary relationships among a source image and image formats according to another embodiment of the present disclosure.

FIG. 6 illustrates exemplary relationships among a source image and image formats according to a further embodiment of the present disclosure.

FIG. 7 illustrates exemplary relationships among a source image and image formats according to another embodiment of the present disclosure.

FIG. 15 illustrates an exemplary computer system finding application in which embodiments of the present disclosure.

DETAILED DESCRIPTION

Embodiments of the present disclosure provide techniques for implementing organizational configurations for multi-directional video and for switching between them. Source images may be assigned to formats that may change during a coding session. When a change occurs between formats, video coders and decoder may transform decoded reference frames from the first configuration to the second configuration. Thereafter, new frames in the second configuration may be coded or decoded predictively using transformed reference frame(s) as source(s) of prediction. In this manner, video coders and decoders may use inter-coding techniques and achieve high efficiency in coding.

Figure 1:
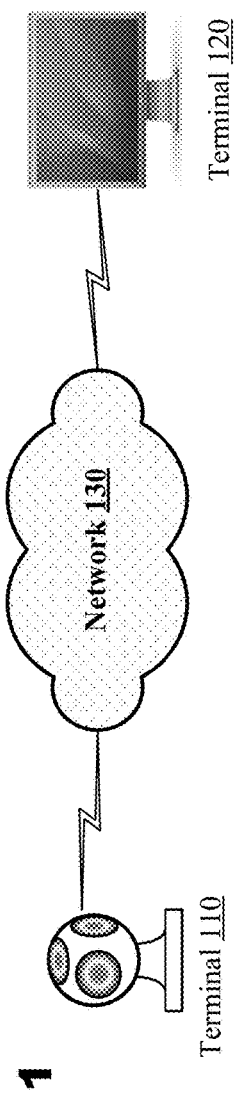
FIG. 1 illustrates a system finding application in which embodiments of the present disclosure.

FIG. 1 illustrates a system 100 in which embodiments of the present disclosure may be employed. The system 100 may include at least two terminals 110, 120 interconnected via a network 130. The first terminal 110 may have an image source that generates multi-directional video. The terminal 110 also may include coding systems and transmission systems (not shown) to transmit coded representations of the multi-directional video to the second terminal 120, where it may be consumed. For example, the second terminal 120 may display the multi-directional video on a local display, it may execute a video editing program to modify the multi-directional video, it may integrate the multi-directional into an application (for example, a virtual reality program), it may present the multi-directional video in head mounted display (for example, virtual reality applications) or it may store the multi-directional video for later use.

FIG. 1 illustrates components that are appropriate for unidirectional transmission of multi-directional video, from the first terminal 110 to the second terminal 120. In some applications, it may be appropriate to provide for bidirectional exchange of video data, in which case the second terminal 120 may include its own image source, video coder and transmitters (not shown), and the first terminal 110 may include its own receiver and display (also not shown). If it is desired to exchange multi-directional video bi-directionally, then the techniques discussed hereinbelow may be replicated to generate a pair of independent unidirectional exchanges of multi-directional video. In other applications, it would be permissible to transmit multi-directional video in one direction (e.g., from the first terminal 110 to the second terminal 120) and transmit "flat" video (e.g., video from a limited field of view) in a reverse direction.

In FIG. 1, the terminals 110, 120 are illustrated as an omnidirectional camera and a computer display, respectively, but the principles of the present disclosure are not so limited. Embodiments of the present disclosure find application with laptop computers, tablet computers, smart phones, servers, media players, virtual reality head mounted displays, augmented reality display, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

Figure 2:
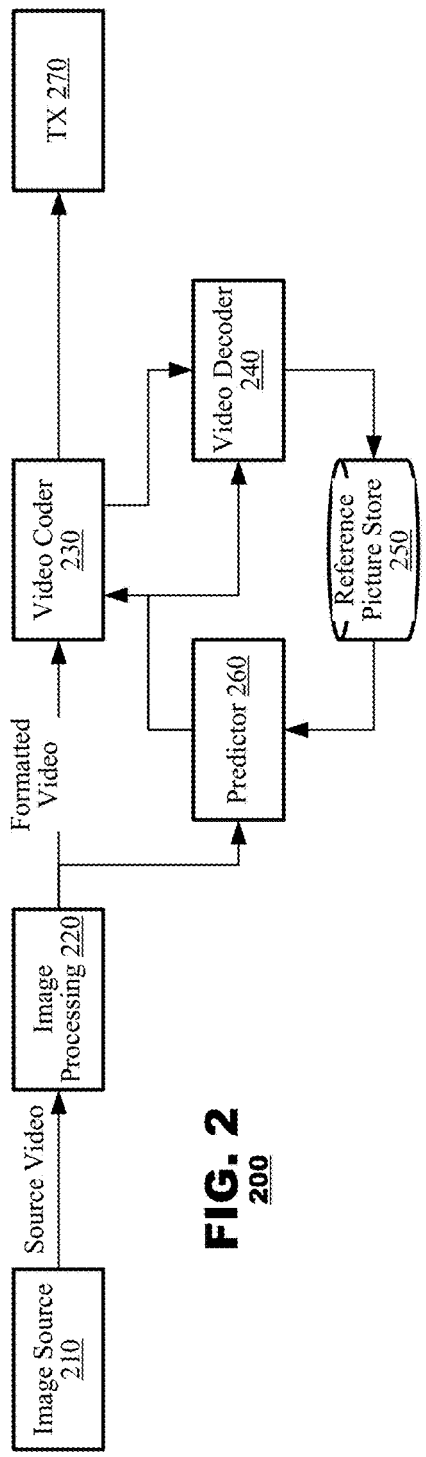
FIG. 2 is a functional block diagram of a coding system according to an embodiment of the present disclosure.

FIG. 2 is a functional block diagram of a coding system 200 according to an embodiment of the present disclosure. The system 200 may include an image source 210, an image processing system 220, a video coder 230, a video decoder 240, a reference picture store 250, a predictor 260, and a transmitter 270. The image source 210 may generate image data as a multi-directional image, containing image data of fields of view that extend around a reference point in multiple directions. Typical image sources are multi-directional and omnidirectional cameras, and also computer applications that generate multi-directional image data, for example, as computer graphics. The image processing system 220 may convert the image data from a source representation to a representation that will be coded by the video coder 230. The video coder 230 may generate a coded representation of its input video data, typically by exploiting spatial and/or temporal redundancies in the video data. The video coder 230 may output a coded representation of the video data that consumes less bandwidth than the input data when transmitted and/or stored. For example, the transmitter 270 may transmit the coded data to another terminal (e.g., terminal 120 in FIG. 1).

The video decoder 240 may invert coding operations performed by the video encoder 230 to obtain a reconstructed picture from the coded video data. Typically, the coding processes applied by the video coder 230 are lossy processes, which cause the reconstructed picture to possess various errors when compared to the original picture. The video decoder 240 may reconstruct picture data of select coded pictures, which are designated as "reference pictures," and store the decoded reference pictures in the reference picture store 250. In the absence of transmission errors, the decoded reference pictures will replicate decoded reference pictures obtained by a decoder at the receiving terminal 120 (FIG. 1).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 260 may furnish the prediction data to the video coder 230. The video coder 230 may code input video data differentially with respect to prediction data furnished by the predictor 260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

The video coder 230, the video decoder 240, the reference picture store 250 and the predictor 260 each operate on video frames in a formatted representation that is determined by the image processor 220. In an embodiment, the format may change from time to time during a coding session and, in response, the format of previously-coded reference frames may change correspondingly.

As indicated, the coded video data output by the video coder 230 should consume less bandwidth than the input data when transmitted and/or stored. The coding system 200 may output the coded video data to a transmitter 270 that may transmit the coded video data across a communication network 130 (FIG. 1). Alternatively, the coded video data may be output to a storage device (also not shown) such as an electronic-, magnetic- and/or optical storage medium.

Figure 3:
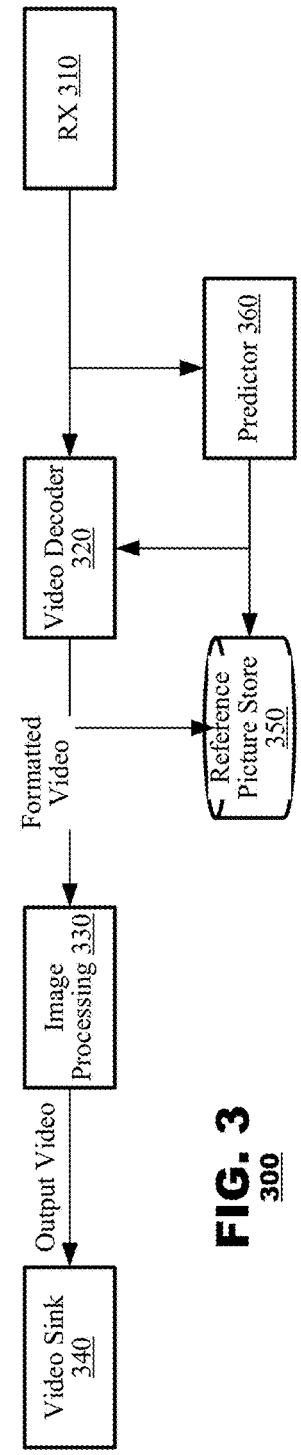
FIG. 3 is a functional block diagram of a decoding system according to an embodiment of the present disclosure.

FIG. 3 is a functional block diagram of a decoding system 300 according to an embodiment of the present disclosure. The system 300 may include a receiver 310, a video decoder 320, an image processing system 330, a video sink 340, a reference picture store 350, and a predictor 360. The receiver 310 may receive coded video data from a channel, for example, from a network 130 (FIG. 1) and may route the coded video data to the video decoder 320. The video decoder 320 may decode the coded video data, obtaining recovered video data therefrom. The recovered frame data may be output to the image processing system 330 which may convert recovered frame data from the format used during coding to another format as appropriate for the video sink 340. The video sink 340 may consume the recovered frame data for purposes within the terminal 120 in which the decoding system 300 resides. For example, the video sink 340 may represent a video display device where the recovered video may be rendered. Alternatively, the video sink 340 may represent an application program (such as a gaming program, a video editing program or a video conferencing program) that will use the recovered video.

Recovered frame data of reference frames may be stored in the reference picture store 350 for use in decoding later-received frames. The predictor 360 may respond to prediction information contained in coded video data to retrieve prediction data and supply it to the video decoder 320 for use in decoding new frames. As indicated, video coding operations often code pixel blocks from within a source image differentially with respect to prediction data. In a video decoder 320, the differential coding processes may be inverted—coded pixel block data may be decoded and then added to prediction data that the predictor 360 retrieves from the reference picture store 350.

In ideal operating conditions, where channel errors do not cause loss of information between a coding system 200 (FIG. 2) and a decoding system 300 (FIG. 3), then the reference picture stores 250, 350 of the two systems 200, 300 will be synchronized. That is, the reference picture stores 250, 350 will have the same content when a given frame from a source video sequence is coded by the video coder 230 (FIG. 2) and when that same frame is decoded by the video decoder 320 (FIG. 3). Over time, as frames from the video sequence are coded and decoded, new frames from the video sequence will be designated as reference frames. Typically, the reference picture stores 250, 350 may have a predetermined capacity that defines how many references frames may serve as candidates for prediction at any given time. The coding system 200 and the decoding system 300 may operate according to a common protocol that determines when new frames are designated to serves as reference frames and condition by which older reference frames are evicted from the reference picture stores 250, 350 in favor of new reference frames.

As discussed, the image processing system 220 (FIG. 2) may define organizational formats for source video for use when the video is coded by a video decoder. Once a format is assigned to a given frame, the video coder 230, the video decoder 240, the reference picture store 250 and the predictor of the coding system 200 may operate on the frame using the assigned format. Similarly, the video decoder 320, the reference picture store 350 and the predictor 360 of the decoding system 300 also operate on the frame using the assigned format. In this manner, a coding system 200 and a decoding system 300 may alter the video formats used for coding as circumstances warrant.

Coding formats may vary based on the organization of views contained therein, based on the resolution of the views and based on projections used to represent the views. The coding formats may vary adaptively based on operating conditions at the coding system 200 and/or decoding system 300. Changes among the coding formats may occur at a frame level within a coding session. Alternatively, the coding formats may change at a slice-level, tile-level, group of frames-level or track-level within a coding session. Several exemplary image formats are described below.

Figure 4:
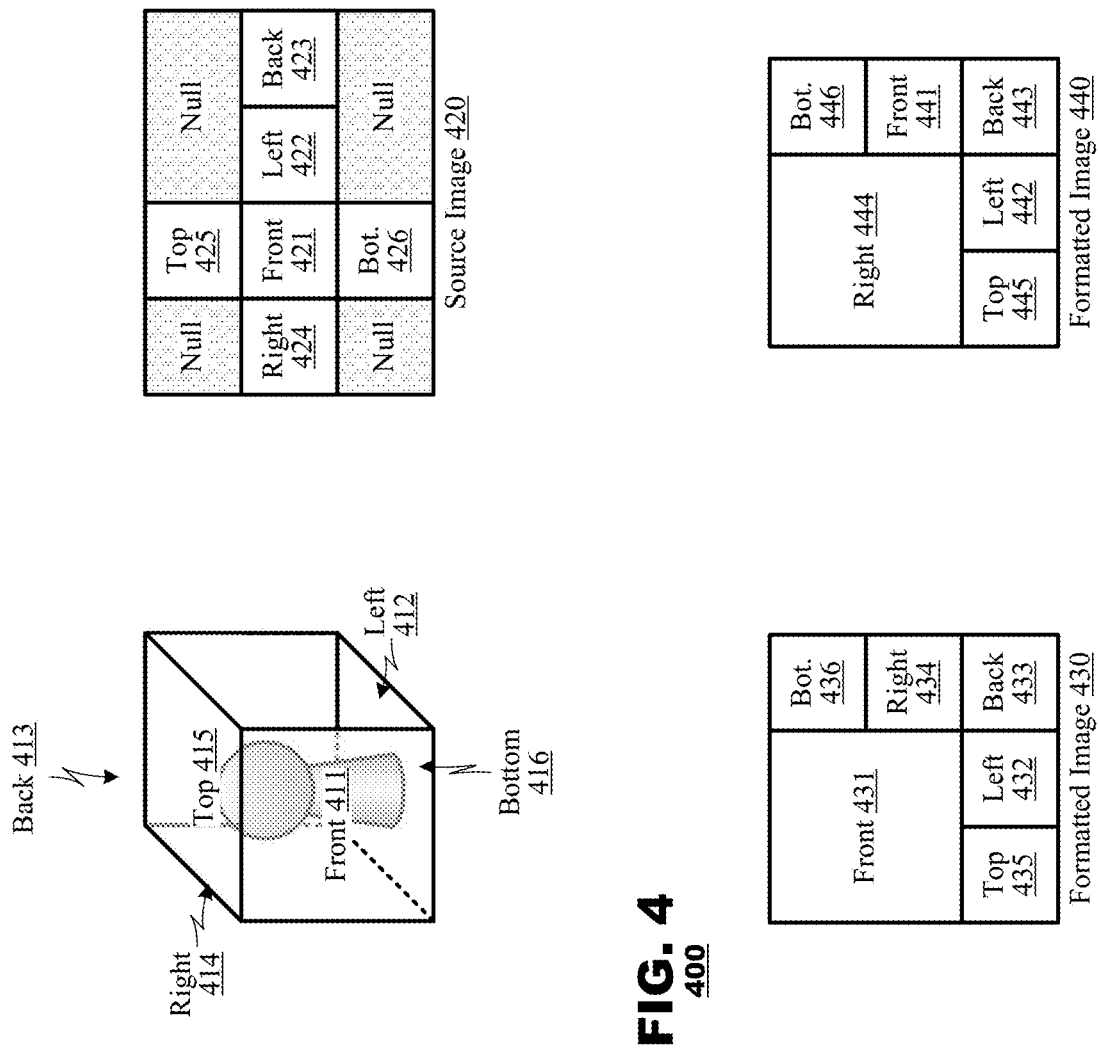
FIG. 4 illustrates exemplary relationships among a source image and image formats according to an embodiment of the present disclosure.

FIG. 4 illustrates exemplary relationships among source images and coded image formats according to an embodiment of the present disclosure. In the embodiment of FIG. 4, an omnidirectional camera 410 may generate image data in a cube map format 420 where image data from differential spatial regions 411-416 about the camera 410 are assigned to different regions 421-426 in the source image 420. For convenience, the regions have been labeled as "front," "left," "back," "right," "top," and "bottom" respectively. Thus, image data from a front region 411 may occupy a predetermined location 421 in the cube map format of the source image 420. Similarly, image data from the left, back, right, top and bottom regions 412-416 occupy respective locations 422-426 in the cube map source image 420. Typically, image data in each region 421-426 of a cube map format image 420 will appear as traditional "flat" image data as if the data of each region were captured from a planar surface about the camera 400. Perspective discontinuities, however, typically exist on content between the regions 421-426.

FIG. 4 illustrates a first exemplary image format 430 that may be created from the source image 420 and used for coding. In this example, content of a front region 431 may be assigned a larger area within the formatted image than the regions 432-436 corresponding to the other fields of view. Thus, as compared to the source image where each region 421-426 has the same size as every other region, the first exemplary formatted image 430 assigns the front region 431 with a higher priority than the other regions 432-436, which results in the front region 431 being given a larger size than those other regions 432-436.

FIG. 4 illustrates a second exemplary formatted image format 440 that may be created from the source image 420. In this example, content of a right region 444 may be assigned a larger area within the formatted image than the regions 441-443, 445-446 corresponding to the other fields of view. Thus, as compared to the source image where each region 421-426 has the same size as every other region, the second exemplary formatted image 440 assigns the right region 444 with a higher priority than the other regions 441-443, 445-446, which results in the right region 444 being given a larger size than those other regions 441-443, 445-446.

As discussed, an image processing system 220 (FIG. 2) may assign a format to source video data before is it coded by a video coder 230. Moreover, the image processing system 220 may alter the format assignments to source video data at various points during operation of a video coder 230.

In one embodiment, an image processor 220 may toggle between different formats such as those shown in FIG. 4. Thus, an image processor 220 may select one or more portions of a source image 420 to have higher priority than other portion(s) of the source image. The higher-priority portions may be assigned a relatively larger size within the image than the other portions and, thus, have higher resolution than the non-selected portions.

As applied to the source image 420 illustrated in FIG. 4, an image processor 220 may select any of the front region 421, the left region 422, the back region 423, the right region 424, the top region 425 and the bottom region 426 to have a higher priority and assign the selected region to occupy a larger space than the non-selected regions within a formatted image. And, of course, the selection of the higher priority region may change at various times during operation of the video coder 230 (FIG. 2).

FIG. 5 illustrates exemplary relationships among source images and coding formats according to another embodiment of the present disclosure. In the example of FIG. 5, an image source may generate a source image 510 in an equirectangular image format. In this format, multi-directional image content may be represented in two dimensions as if it were captured from a cylindrical surface about a camera (not shown). The capture operation may cause distortion of image data from different fields of view. For example, image content typically considered top and bottom image data may be stretched to occupy the full width of the two dimensional image spaces that they occupy. Image content that corresponds to front, left, back and right fields of view may exhibit distortions from two dimensional representations; the distortions typically become more exaggerated at distances farther removed from an "equator" of the image.

FIG. 5 illustrates an exemplary pair of formats 530, 540 that may be created from the source image 510. In this example, the source image 510 may be partitioned in predetermined portions P1-P8, as shown in a partitioned image 520. Thereafter, different ones of portions P1-P8 may be assigned higher priority than the other portions in the formatted image.

In the example of FIG. 5, the formatted image 530 illustrates portions P2 and P6 having been selected as higher priority portions than portions P1, P3-P5 and P7-P8. The formatted image 540 illustrates portions P3 and P7 having been selected as higher priority portions than portions P1-P2, P4-P6 and P8. In each case, the higher priority portions are assigned relatively larger space than the non-selected portions and, thus, have higher resolution than the non-selected portions.

FIG. 6 illustrates exemplary relationships among source images and coding formats according to another embodiment of the present disclosure. In the example of FIG. 6, a stereoscopic camera 600 may generate a source image 610 in a stereoscopic image format having left eye and right eye images 612, 614. The source image 610 may be transformed into a formatted image 620 using alterations of projection, resolution and/or organization. In the example illustrated in FIG. 6, the right eye image 624 is shown having been transformed from a native representation to an equirectangular representation.

Frame formats used for coding also may alter other aspects of captured video data. For example, frame formats may project image from their source projection to an alternate projection. FIG. 7 illustrates an example of one such formatting operation applied to the frame format of FIG. 5. In this example, a native projection of an image 710 causes image content of top and bottom fields of view 714, 714 to be stretched across the entire width of the source image 710. The image content of the top and bottom fields of view may be re-projected into smaller regions 732, 734. The re-projected data may be projected from its native representation 710 to a spherical projection 720, where image content of the top and bottom fields of view 712, 714 are projected to corresponding locations 722, 724 in a spherical projection 720. Once projected to a spherical representation, the image content of the top and bottom fields of view 722, 724 may be projected to respective representations 732, 734 in the formatted image 730.

When projecting image data from the native representation to the spherical projection, an image processor 220 (FIG. 2) may transform pixel data at locations (x,y) within the top and bottom views 712, 714 to locations (θ, φ) along a spherical projection 720 according to a transform such as:

$$\theta = \alpha \cdot x + \theta_0, \text{ and} \quad \text{(Eq. 1.)}$$

$$\varphi = \beta \cdot y + \varphi_0, \text{ where} \quad \text{(Eq. 2.)}$$

θ and φ respectively represents the longitude and latitude of a location in the spherical projection 720, α, β are scalars, $\theta_0$, $\varphi_0$ represent an origin of the spherical projection 720, and x and y represent the horizontal and vertical coordinates of source data in top and bottom views 712, 714 of the source image 710.

The image processor 220 (FIG. 2) may perform a transform of image data in the spherical projection 720 to image data for the top and bottom regions 732, 734 through counter-part transform techniques. Image data for the top region 732 may be derived from spherical projection data corresponding to a first pole 722 of the spherical projection 720. Similarly, image data for the bottom region 734 may be derived from spherical projection data corresponding to a second pole 720 of the spherical projection 720. Specifically, pixel locations (θ,φ) in the spherical projection 720 may map to locations (x,y,z) in a three-dimensional Cartesian space as follows:

$$x = r^* \sin(\varphi)^* \cos(\theta), \quad \text{(Eq. 3.)}$$

$$y = r^* \sin(\varphi)^* \sin(\theta) \quad \text{(Eq. 4.)}$$

$$z = r^* \cos(\varphi), \text{ where} \quad \text{(Eq. 5.)}$$

r represents a radial distance of the point φ from a center of the respective polar region 722, 724.

Figures 8, 9:
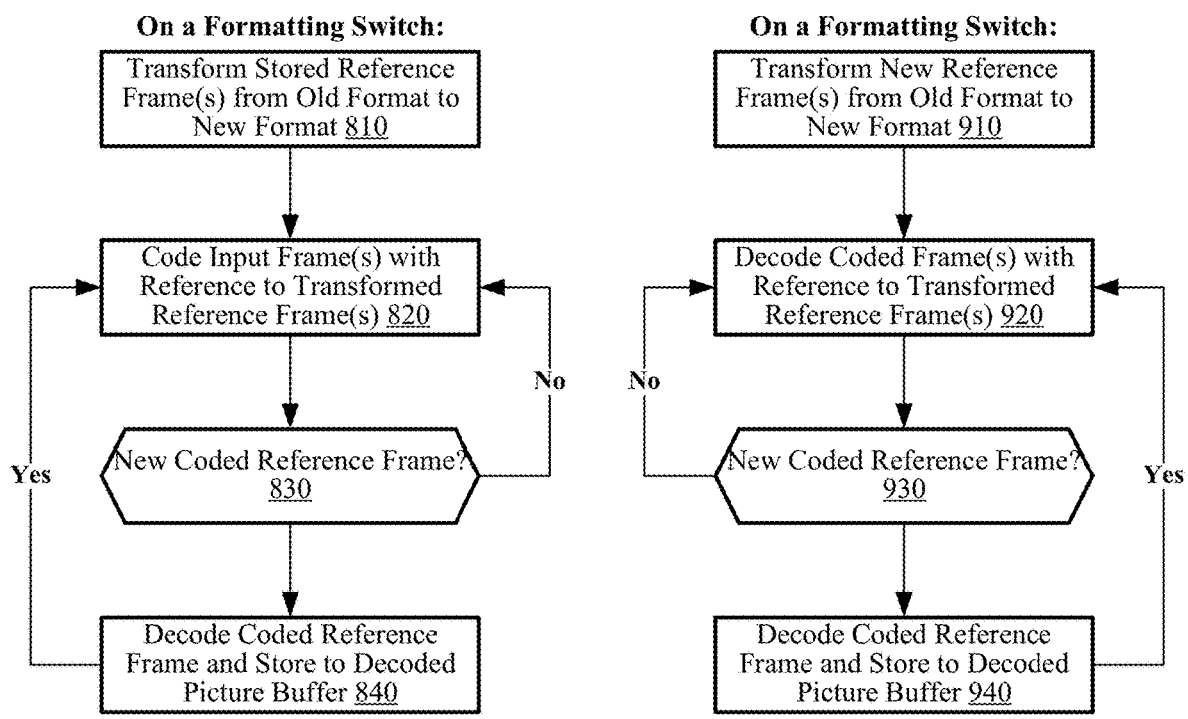
FIG. 8 illustrates a method according to an embodiment of the present disclosure.
FIG. 9 illustrates a method according to an embodiment of the present disclosure.

FIG. 8 illustrates a method 800 according to an embodiment of the present disclosure. The method 800 may become operative when an image processor effects a switch between a first formatted representation of video data to a second representation. When a switch occurs, the method 800 may transform reference frames stored by a coding system from an old format to a new format (box 810). Thereafter, the method 800 may code input frames with reference to the transformed reference frames (box 820). The transformed reference frames will match the format of the input frame. The method 800 may determine whether the coded input frame is designated as a reference frame (box 830). If so, the method 800 may decode the coded reference frame and store a recovered reference frame obtained therefrom to the decoded picture buffer (box 840). The method 800 may repeat operation of boxes 820-840 as long as the image processor generates frames according to the new format.

It is expected that, over time, as new input frames are coded and designated as reference frames, that decoded reference frames will replace the transformed reference frames in the decoded picture buffer. Thus, any coding inefficiencies that might be obtained from use of the transformed reference frames will be overcome by the ordinary eviction policies under which the decoded picture buffer operates.

FIG. 9 illustrates a method 900 according to an embodiment of the present disclosure. The method 900 may become operative at a decoding system that operates on coded video data, when the decoding system encounters signaling in the coded video data that identifies a switch between a first format of video data to a second format. When a switch occurs, the method 900 may transform reference frames stored by the decoding system from an old format to a new format (box 910). Thereafter, the method 900 may decode coded frames with reference to the transformed reference frames (box 920). The transformed reference frames will match the format of the coded frames. The method 900 may determine whether the coded frame is designated as a reference frame (box 930). If so, the method 900 may store a recovered reference frame obtained therefrom to the decoded picture buffer (box 940). The method 900 may repeat operation of boxes 920-940 as long as coded video data is presented according to the new format.

It is expected that, over time, as new coded frames are decoded and reference frames are obtained therefrom, that decoded reference frames will replace the transformed reference frames in the decoded picture buffer. Thus, any coding inefficiencies that might be obtained from use of the transformed reference frames will be overcome by the ordinary eviction policies under which the decoded picture buffer operates.

Switching may be triggered in a variety of ways. In a first embodiment, activity at a decoding terminal 120 (FIG. 1) may identify an area of interest, which may be reported to the first terminal 110. For example, many video rendering environments do not render all content of multi-directional video simultaneously. Instead, a sub-portion of the video may be selected rendered based on operator control or local rendering conditions. In such a case, for example, if an operator selects a sub-portion of the video to be rendered, an image processor 220 in a coding system 200 (FIG. 2) may define a format that prioritizes the selected content.

In another embodiment, an image processor 220 may assign priority to region(s) of a multi-directional image based on characteristics of the image data itself. For example, image analysis may identify regions within an input frame that indicates the presence of relatively close objects (identified by depth analyses of the frame) or motion activity occurs (identified by motion analysis of the frame). Such regions may be selected as high priority regions of the image and a format that prioritizes these regions(s) may be defined for coding.

In a further embodiment, an image processor 220 may select frame formats based on estimates of distortion among candidate frame formats and selecting one of the frame formats that minimizes distortion under a governing coding rate. For example, a governing coding rate may be imposed by a bit rate afforded by a channel between a coding system 200 and a decoding system 300. Distortion estimates may be calculated for eligible frame formats based on candidate viewing conditions, for example, estimates of how often a segment of video is likely to be viewed. Dynamic switching may be performed when an eligible frame format is identified that is estimated to have lower distortion than another frame format that is then being used for coding.

Figure 10:
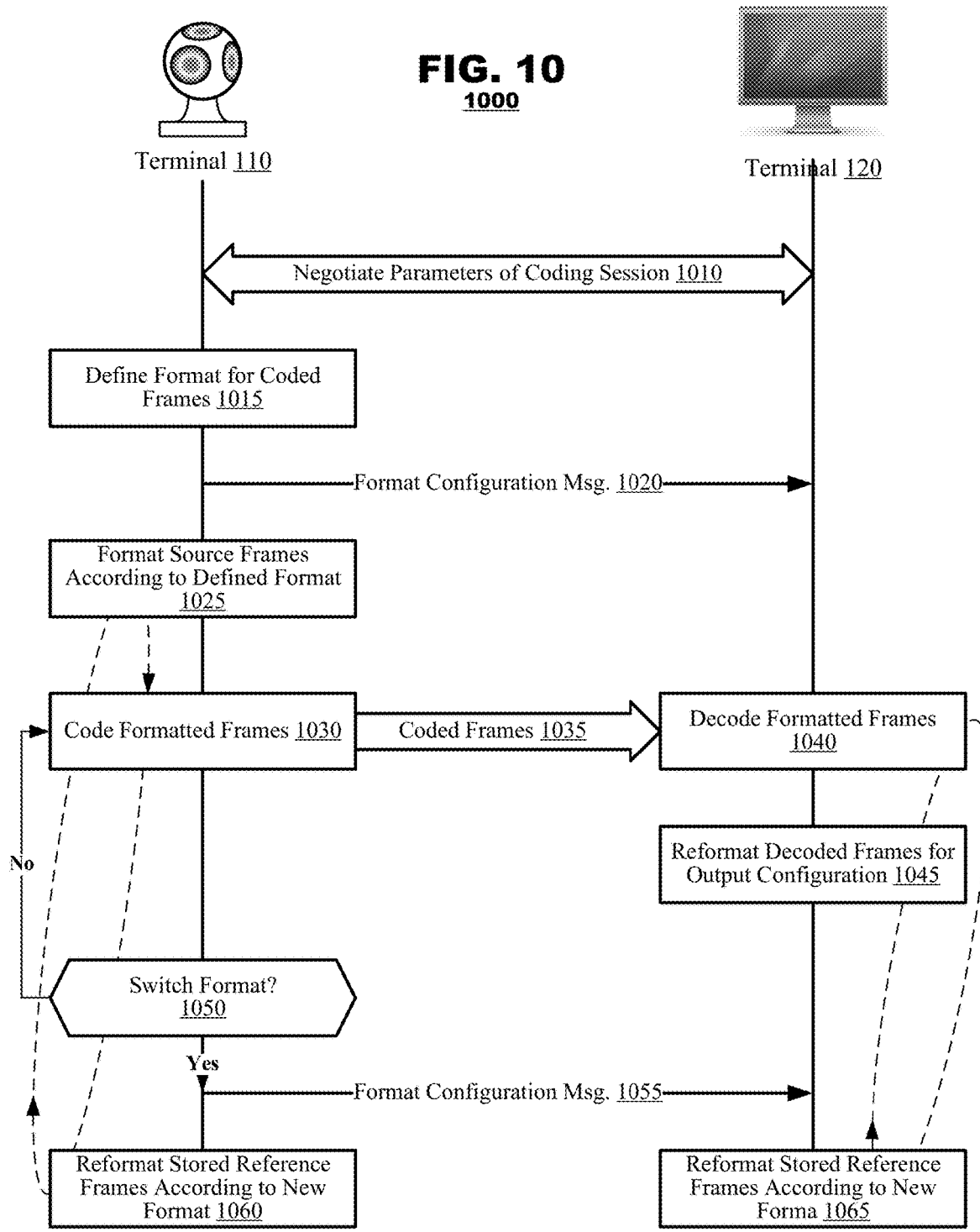
FIG. 10 illustrates a communication flow according to an embodiment of the present disclosure.

FIG. 10 illustrates a communication flow 1000 between a pair of terminals 110, 120 according to an embodiment of the present disclosure. The terminals 110, 120 initially may exchange messaging 1010 identifying parameters of a coding session between them. As part of this signaling, an encoding terminal 110 may define a format for coded video (box 1015) and may provide a format configuration message 1020 identifying a format that was selected. Thereafter, the encoding terminal 110 may pack source video frames according to the selected format (box 1025) and may code the formatted frames (box 1030). The encoding terminal 110 may transmit the coded frames to the decoding terminal 1020, where they are decoded (box 1040) and, as appropriate, formatted into an output configuration (box 1045) that is suitable for its use at the decoding terminal 120.

The encoding terminal 110 may determine whether its format should be switched (box 1050). If the encoding terminal 110 determines that the format should be switched, the encoding terminal 110 may send a new message 1055 to the decoding terminal 120 identifying the new configuration. In response to the format configuration message 1055 both terminals 110, 120 may repack reference frames stored in their decoded picture buffers according to the new configuration (boxes 1060, 1065). The operations 1025-1065 may repeat for as long as necessary under the coding session.

Figure 11:
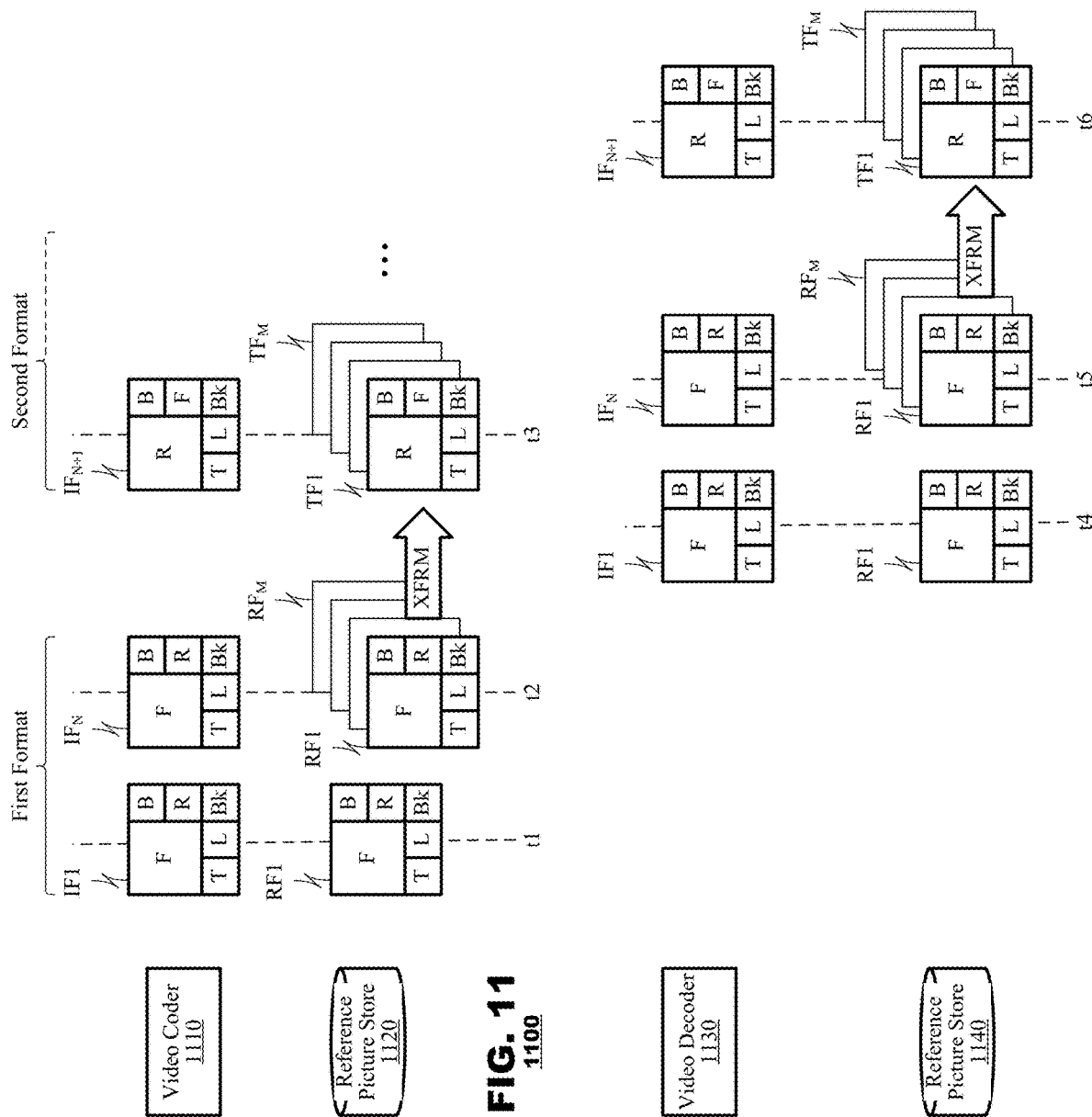
FIG. 11 is a timeline illustrating impact of an exemplary format switch according to an embodiment of the present disclosure.

FIG. 11 is a timeline illustrating impact of an exemplary format switch at a video coder 1110, the video coder's reference picture store 1120, a video decoder 1130 and the decoder's reference picture store 1140 according to an embodiment of the present disclosure. In this example, a first set of input video frames $IF_1$-$IF_N$ of a video sequence are assigned a first format and a second set of input video frames, beginning with input frame $IF_{N+1}$, are assigned a second format.

The coding session may begin at a time $t_1$, when a first frame is coded. At this point, the reference picture store 1120 likely will be empty (because the input frame $IF_1$ is the first frame to be processed). The input frame $IF_1$ may be coded by intra-coding and output from the video coder. The coded input frame $IF_1$ likely will be designated as a reference frame and, therefore, it may be decoded and stored to the reference picture store as reference frame $RF_1$.

Input frames $IF_2$-$IF_N$ may be coded according to the first format, also. The video coder 1110 may code the input frames predictively, using reference frames from the reference picture store 1120 as bases for prediction. The coded input frames $IF_2$-$IF_N$ may output from the video coder 1110. Select coded input frames $IF_2$-$IF_N$ may be designated as reference frames and stored to the reference picture store 1120. Thus, at time $t_2$, after the input frame $IF_N$ is coded, the reference picture store 1120 may store reference frames $RF_1$-$RF_M$.

The input frames' format may change to the second format when input frame $IF_{N+1}$ is coded by the video coder. In response, the reference frames $RF_1$-$RF_M$ may be transformed from a representation corresponding to the first format to a representation corresponding to the second format. The input frame $IF_{N+1}$ may be coded predictively using select transformed frame(s) $TF_1$-$TF_M$ as prediction references and output from the video coder. If the coded input frame $IF_{N+1}$ is designated as a reference frame, it may be decoded and stored to the reference picture store as reference frame $RF_{N+1}$ (not shown).

At the video decoder 1130, decoding may begin at a time $t_4$, when a first coded frame is decoded. At this point, the reference picture store 1140 will be empty because the input frame $IF_1$ is the first frame to be processed. The input frame $IF_1$ may be decoded and output from the video decoder 1130. The decoded frame $IF_1$ likely will have been designated as a reference frame and, therefore, it may be stored to the reference picture store 1140 as reference frame $RF_1$.

Coded input frames $IF_2$-$IF_N$ may be decoded according to the first format, also. The video decoder 1130 may decode the input frames according to the coding modes applied by the video coder 1110, using reference frames from the reference picture store 1140 as bases for prediction when so designated. The decoded input frames $IF_2$-$IF_N$ may be output from the video decoder 1130. Decoded input frames $IF_2$-$IF_N$ that are designated as reference frames also may be stored to the reference picture store 1140. Thus, at time $t_5$, after the coded input frame $IF_N$ is decoded, the reference picture store 1140 may store reference frames $RF_1$-$RF_M$.

In this example, the frames' format changes to the second format when the coded input frame $IF_{N+1}$ is decoded by the video decoder 1130. In response, the reference frames $RF_1$-$RF_M$ may be transformed from a representation corresponding to the first format to a representation corresponding to the second format. The coded input frame $IF_{N+1}$ may be coded predictively using designated transformed frame(s) $TF_1$-$TF_M$ as prediction references and output from the video decoder 1130. If the decoded input frame $IF_{N+1}$ is designated as a reference frame, it may be stored to the reference picture store 1140 as reference frame $RF_{N+1}$ (not shown).

Note that, in the foregoing example, there are no constraints on the timing between the coding events at times $t_1$-$t_3$ and the decoding events at times $t_4$-$t_6$. The principles of the present disclosure apply equally as well to real time coding scenarios, which may be appropriate for "live" video feeds, and also to store-and-forward coding scenarios, where video may be coded for storage and then delivered to decoding devices on demand.

Transforms of reference pictures may be performed in a variety of different ways. In a simple example, a region of image data that is being "demoted" in priority may be spatially downscaled according to the size differences between the region that the demoted content occupies in the reference frame and the region that the demoted content occupies in the transform frame. For example, the front region F in reference frame $RF_1$ is demoted when generating transform frame $TF_1$; it may be downscaled according to the size differences that occur due to this demotion.

Similarly, a region of image data that is "promoted" in priority may be spatially upsampled according to the size differences between the region that the promoted content occupies in the reference frame and the region that the promoted content occupies in the transform frame. For example, in FIG. 11, the right region R in reference frame $RF_1$ is promoted when generating the transform frame $TF_1$; it may be upscaled according to the size differences that occur due to this promotion.

Although not illustrated in FIG. 11, formats can involve promotions and demotions of content among different sizes. Thus, although the first format illustrates the left, back, right, top and bottom regions each occupying the same size as each other, embodiments of the present disclosure permit these lower-priority regions to have different sizes from each other. Thus, format may define multiple tiers of priority—for example, a high, medium and low tier—with each tier having a respective size. In practice, it is expected that system designers will develop systems where the number of tiers and the relative sizes among these tiers are tailored to fit their individual needs.

Figure 12:
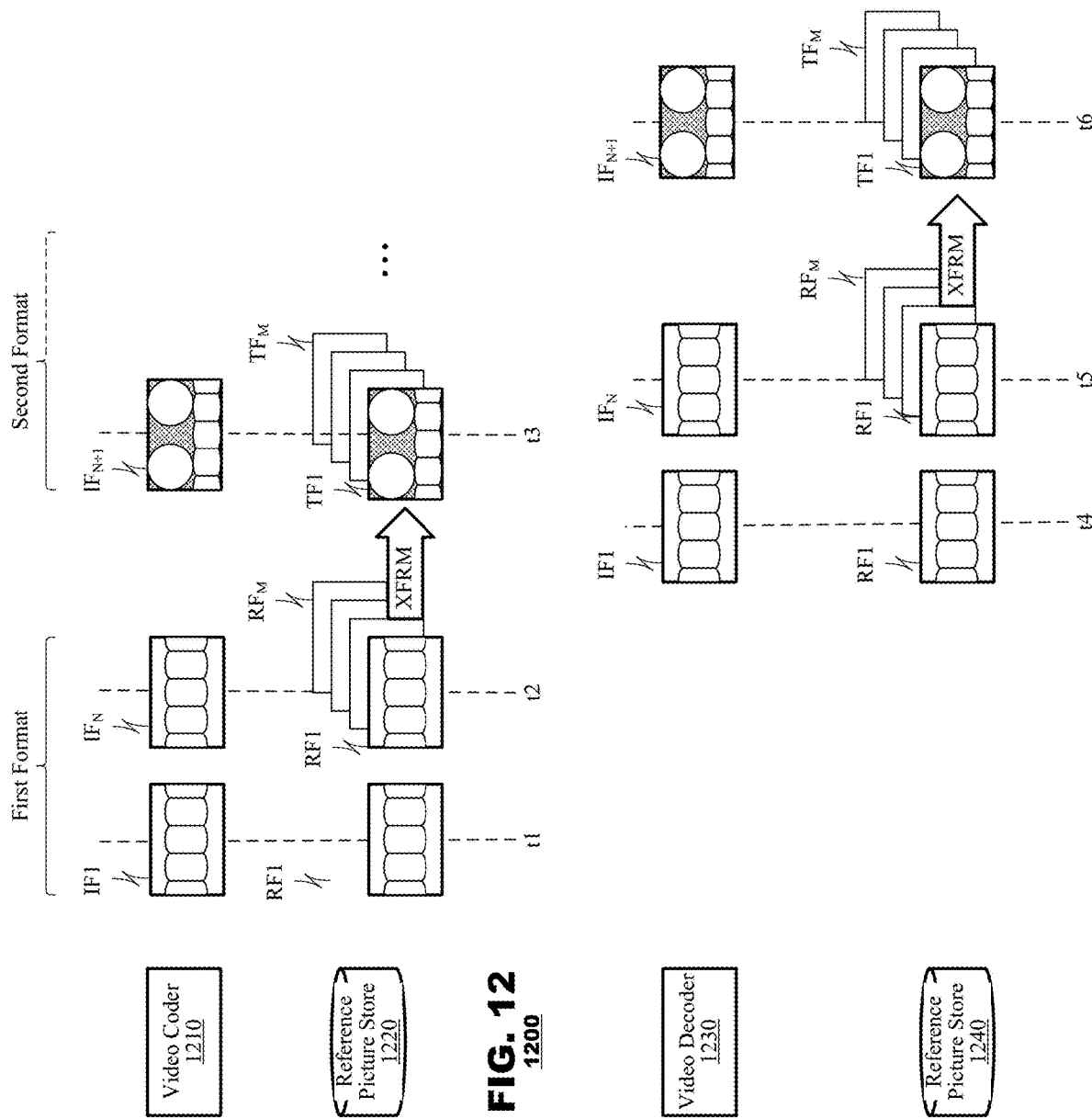
FIG. 12 is a timeline illustrating impact of another exemplary format switch according to an embodiment of the present disclosure.

FIG. 12 is a timeline illustrating impact of another exemplary format switch at a video coder 1210, the video coder's reference picture store 1220, a video decoder 1230 and the decoder's reference picture store 1240 according to an embodiment of the present disclosure. In this example, a first set of input video frames $IF_1$-$IF_N$ of a video sequence are assigned a first format and a second set of input video frames, beginning with input frame $IF_{N+1}$, are assigned a second format. In this example, the first format uses equirectangular formatted images and the second format converts top and bottom fields of view from the equirectangular image to smaller regions as shown in the example of FIG. 7.

As in the prior example, a coding session may begin at a time $t_1$, when a first frame is coded. At this point, the reference picture store 1220 likely will be empty (because the input frame $IF_1$ is the first frame to be processed). The input frame $IF_1$ may be coded by intra-coding and output from the video coder. The coded input frame $IF_1$ likely will be designated as a reference frame and, therefore, it may be decoded and stored to the reference picture store as reference frame $RF_1$.

Input frames $IF_2$-$IF_N$ may be coded according to the first format, also. The video coder 1210 may code the input frames predictively, using reference frames from the reference picture store 1220 as bases for prediction. The coded input frames $IF_2$-$IF_N$ may output from the video coder 1210. Select coded input frames $IF_2$-$IF_N$ may be designated as reference frames and stored to the reference picture store 1220. Thus, at time $t_2$, after the input frame $IF_N$ is coded, the reference picture store 1220 may store reference frames $RF_1$-$RF_M$.

The input frames' format may change to the second format when input frame $IF_{N+1}$ is coded by the video coder. In response, the reference frames $RF_1$-$RF_M$ may be transformed from a representation corresponding to the first format to a representation corresponding to the second format. The input frame $IF_{N+1}$ may be coded predictively using select transformed frame(s) $TF_1$-$TF_M$ as prediction references and output from the video coder. If the coded input frame $IF_{N+1}$ is designated as a reference frame, it may be decoded and stored to the reference picture store as reference frame $RF_{N+1}$ (not shown).

At the video decoder 1230, decoding may begin at a time $t_4$, when a first coded frame is decoded. At this point, the reference picture store 1240 will be empty because the input frame $IF_1$ is the first frame to be processed. The input frame $IF_1$ may be decoded and output from the video decoder 1230. The decoded frame $IF_1$ likely will have been designated as a reference frame and, therefore, it may be stored to the reference picture store 1240 as reference frame $RF_1$.

Coded input frames $IF_2$-$IF_N$ may be decoded according to the first format, also. The video decoder 1230 may decode the input frames according to the coding modes applied by the video coder 1210, using reference frames from the reference picture store 1240 as bases for prediction when so designated. The decoded input frames $IF_2$-$IF_N$ may be output from the video decoder 1230. Decoded input frames $IF_2$-$IF_N$ that are designated as reference frames also may be stored to the reference picture store 1240. Thus, at time $t_5$, after the coded input frame $IF_N$ is decoded, the reference picture store 1240 may store reference frames $RF_1$-$RF_M$.

In this example, the frames' format changes to the second format when the coded input frame $IF_{N+1}$ is decoded by the video decoder 1230. In response, the reference frames $RF_1$-$RF_M$ may be transformed from a representation corresponding to the first format to a representation corresponding to the second format. The coded input frame $IF_{N+1}$ may be coded predictively using designated transformed frame(s) $TF_1$-$TF_M$ as prediction references and output from the video decoder 1230. If the decoded input frame $IF_{N+1}$ is designated as a reference frame, it may be stored to the reference picture store 1240 as reference frame $RF_{N+1}$ (not shown).

As in the prior example, there are no constraints on the timing between the coding events at times $t_1$-$t_3$ and the decoding events at times $t_4$-$t_6$. The principles of the present disclosure apply equally as well to real time coding scenarios, which may be appropriate for "live" video feeds, and also to store-and-forward coding scenarios, where video may be coded for storage and then delivered to decoding devices on demand.

Figure 13:
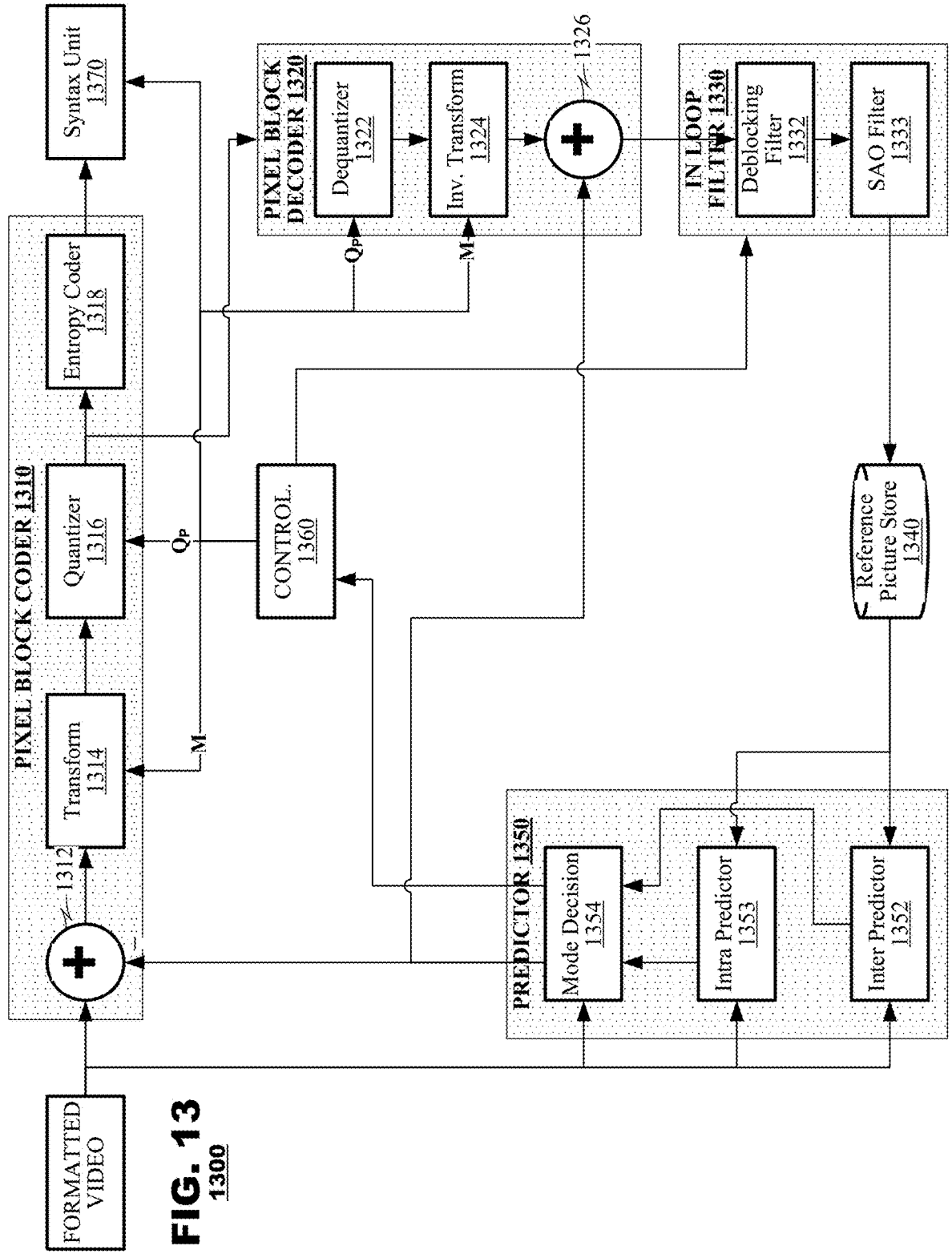
FIG. 13 is a functional block diagram of a coding system according to an embodiment of the present disclosure.

FIG. 13 is a functional block diagram of a coding system 1300 according to an embodiment of the present disclosure. The system 1300 may include a pixel block coder 1310, a pixel block decoder 1320, an in-loop filter system 1330, a reference picture store 1340, a predictor 1350, a controller 1360, and a syntax unit 1370. The pixel block coder and decoder 1310, 1320 and the predictor 1350 may operate iteratively on individual pixel blocks of a picture that has been formatted according to a governing format. The predictor 1350 may predict data for use during coding of a newly-presented input pixel block. The pixel block coder 1310 may code the new pixel block by predictive coding techniques and present coded pixel block data to the syntax unit 1370. The pixel block decoder 1320 may decode the coded pixel block data, generating decoded pixel block data therefrom. The in-loop filter 1330 may perform various filtering operations on a decoded picture that is assembled from the decoded pixel blocks obtained by the pixel block decoder 1320. The filtered picture may be stored in the reference picture store 1340 where it may be used as a source of prediction of a later-received pixel block. The syntax unit 1370 may assemble a data stream from the coded pixel block data which conforms to a governing coding protocol.

The pixel block coder 1310 may include a subtractor 1312, a transform unit 1314, a quantizer 1316, and an entropy coder 1318. The pixel block coder 1310 may accept pixel blocks of input data at the subtractor 1312. The subtractor 1312 may receive predicted pixel blocks from the predictor 1350 and generate an array of pixel residuals therefrom representing a difference between the input pixel block and the predicted pixel block. The transform unit 1314 may apply a transform to the sample data output from the subtractor 1312, to convert data from the pixel domain to a domain of transform coefficients. The quantizer 1316 may perform quantization of transform coefficients output by the transform unit 1314. The quantizer 1316 may be a uniform or a non-uniform quantizer. The entropy coder 1318 may reduce bandwidth of the output of the coefficient quantizer by coding the output, for example, by variable length code words.

The transform unit 1314 may operate in a variety of transform modes as determined by the controller 1360. For example, the transform unit 1314 may apply a discrete cosine transform (DCT), a discrete sine transform (DST), a Walsh-Hadamard transform, a Haar transform, a Daubechies wavelet transform, or the like. In an embodiment, the controller 1360 may select a coding mode M to be applied by the transform unit 1315, may configure the transform unit 1315 accordingly and may signal the coding mode M in the coded video data, either expressly or impliedly.

The quantizer 1316 may operate according to a quantization parameter $Q_P$ that is supplied by the controller 1360. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The pixel block decoder 1320 may invert coding operations of the pixel block coder 1310. For example, the pixel block decoder 1320 may include a dequantizer 1322, an inverse transform unit 1324, and an adder 1326. The pixel block decoder 1320 may take its input data from an output of the quantizer 1316. Although permissible, the pixel block decoder 1320 need not perform entropy decoding of entropy-coded data since entropy coding is a lossless event. The dequantizer 1322 may invert operations of the quantizer 1316 of the pixel block coder 1310. The dequantizer 1322 may perform uniform or non-uniform de-quantization as specified by the decoded signal $Q_P$. Similarly, the inverse transform unit 1324 may invert operations of the transform unit 1314. The dequantizer 1322 and the inverse transform unit 1324 may use the same quantization parameters $Q_P$ and transform mode M as their counterparts in the pixel block coder 1310. Quantization operations likely will truncate data in various respects and, therefore, data recovered by the dequantizer 1322 likely will possess coding errors when compared to the data presented to the quantizer 1316 in the pixel block coder 1310.

The adder 1326 may invert operations performed by the subtractor 1312. It may receive the same prediction pixel block from the predictor 1350 that the subtractor 1312 used in generating residual signals. The adder 1326 may add the prediction pixel block to reconstructed residual values output by the inverse transform unit 1324 and may output reconstructed pixel block data.

The in-loop filter 1330 may perform various filtering operations on recovered pixel block data. For example, the in-loop filter 1330 may include a deblocking filter 1332 and a sample adaptive offset ("SAO") filter 1333. The deblocking filter 1332 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 1330 may operate according to parameters that are selected by the controller 1360.

The reference picture store 1340 may store filtered pixel data for use in later prediction of other pixel blocks. Different types of prediction data are made available to the predictor 1350 for different prediction modes. For example, for an input pixel block, intra prediction takes a prediction reference from decoded data of the same picture in which the input pixel block is located. Thus, the reference picture store 1340 may store decoded pixel block data of each picture as it is coded. For the same input pixel block, inter prediction may take a prediction reference from previously coded and decoded picture(s) that are designated as reference pictures. Thus, the reference picture store 1340 may store these decoded reference pictures.

As discussed, the predictor 1350 may supply prediction data to the pixel block coder 1310 for use in generating residuals. The predictor 1350 may include an inter predictor 1352, an intra predictor 1353 and a mode decision unit 1352. The inter predictor 1352 may receive pixel block data representing a new pixel block to be coded and may search reference picture data from store 1340 for pixel block data from reference picture(s) for use in coding the input pixel block. The inter predictor 1352 may support a plurality of prediction modes, such as P mode coding and B mode coding. The inter predictor 1352 may select an inter prediction mode and an identification of candidate prediction reference data that provides a closest match to the input pixel block being coded. The inter predictor 1352 may generate prediction reference metadata, such as motion vectors, to identify which portion(s) of which reference pictures were selected as source(s) of prediction for the input pixel block.

The intra predictor 1353 may support Intra (I) mode coding. The intra predictor 1353 may search from among pixel block data from the same picture as the pixel block being coded that provides a closest match to the input pixel block. The intra predictor 1353 also may generate prediction reference indicators to identify which portion of the picture was selected as a source of prediction for the input pixel block.

The mode decision unit 1352 may select a final coding mode to be applied to the input pixel block. Typically, as described above, the mode decision unit 1352 selects the prediction mode that will achieve the lowest distortion when video is decoded given a target bitrate. Exceptions may arise when coding modes are selected to satisfy other policies to which the coding system 1300 adheres, such as satisfying a particular channel behavior, or supporting random access or data refresh policies. When the mode decision selects the final coding mode, the mode decision unit 1352 may output a selected reference block from the store 1340 to the pixel block coder and decoder 1310, 1320 and may supply to the controller 1360 an identification of the selected prediction mode along with the prediction reference indicators corresponding to the selected mode.

The controller 1360 may control overall operation of the coding system 1300. The controller 1360 may select operational parameters for the pixel block coder 1310 and the predictor 1350 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1370, which may include data representing those parameters in the data stream of coded video data output by the system 1300. The controller 1360 also may select between different modes of operation by which the system may generate reference images and may include metadata identifying the modes selected for each portion of coded data.

During operation, the controller 1360 may revise operational parameters of the quantizer 1316 and the transform unit 1315 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 1360 may control operation of the in-loop filter 1330 and the prediction unit 1350. Such control may include, for the prediction unit 1350, mode selection (lambda, modes to be tested, search windows, distortion strategies, etc.), and, for the in-loop filter 1330, selection of filter parameters, reordering parameters, weighted prediction, etc.

And, further, the controller 1360 may perform transforms of reference pictures stored in the reference picture store when new formats are defined for input video.

The principles of the present discussion may be used cooperatively with other coding operations that have been proposed for multi-directional video. For example, the predictor 1350 may perform prediction searches using input pixel block data and reference pixel block data in a spherical projection. Operation of such prediction techniques are described in U.S. patent application Ser. No. 15/390,202, filed Dec. 23, 2016 and assigned to the assignee of the present application. In such an embodiment, the coder 1300 may include a spherical transform unit 1390 that transforms input pixel block data to a spherical domain prior to being input to the predictor 1350.

Figure 14:
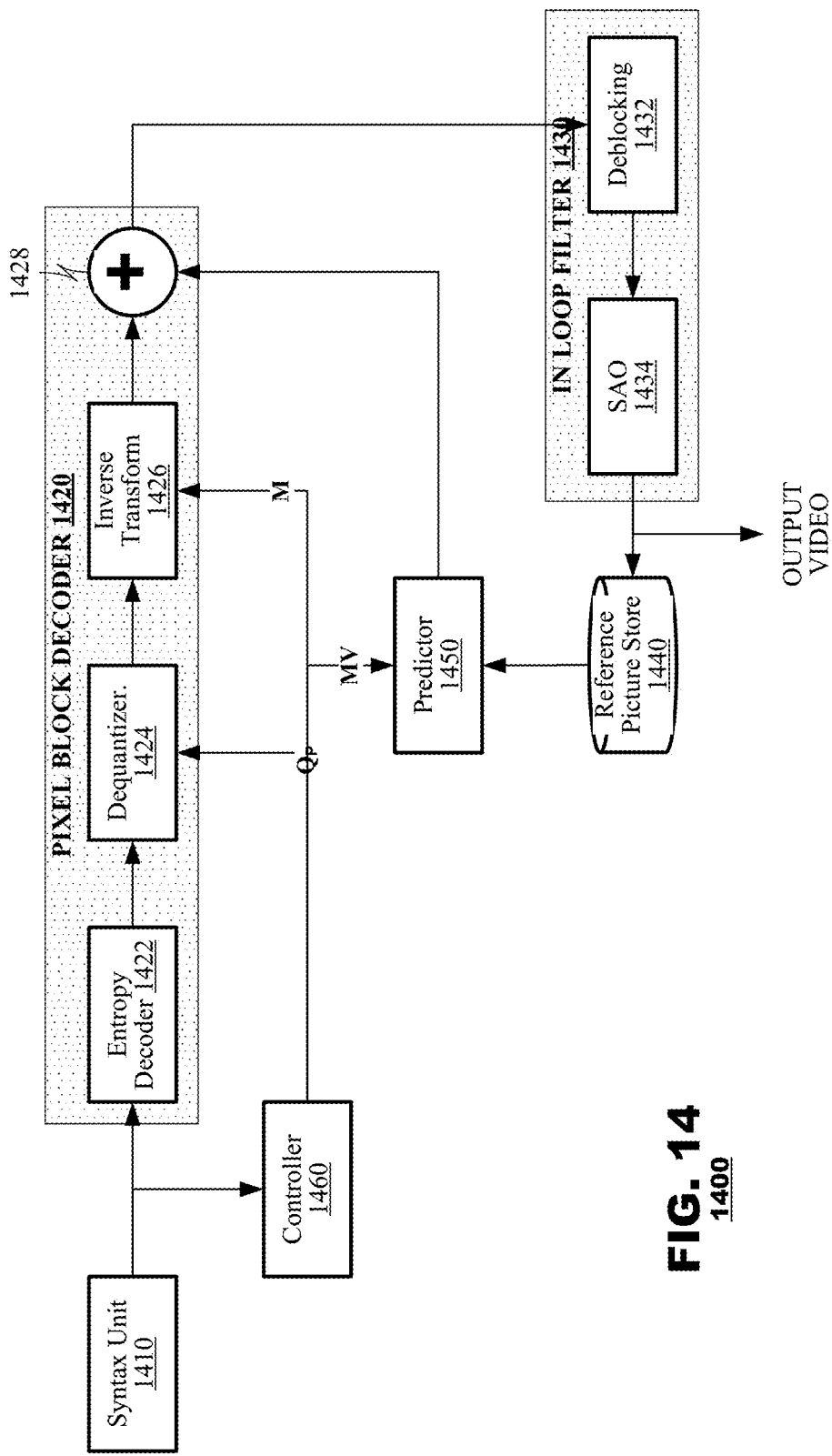
FIG. 14 is a functional block diagram of a decoding system according to an embodiment of the present disclosure.

FIG. 14 is a functional block diagram of a decoding system 1400 according to an embodiment of the present disclosure. The decoding system 1400 may include a syntax unit 1410, a pixel block decoder 1420, an in-loop filter 1430, a reference picture store 1440, a predictor 1450, and a controller 1460. The syntax unit 1410 may receive a coded video data stream and may parse the coded data into its constituent parts. Data representing coding parameters may be furnished to the controller 1460 while data representing coded residuals (the data output by the pixel block coder 1310 of FIG. 13) may be furnished to the pixel block decoder 1420. The pixel block decoder 1420 may invert coding operations provided by the pixel block coder 1310 (FIG. 13). The in-loop filter 1430 may filter reconstructed pixel block data. The reconstructed pixel block data may be assembled into pictures for display and output from the decoding system 1400 as output video. The pictures also may be stored in the prediction buffer 1440 for use in prediction operations. The predictor 1450 may supply prediction data to the pixel block decoder 1420 as determined by coding data received in the coded video data stream.

The pixel block decoder 1420 may include an entropy decoder 1422, a dequantizer 1424, an inverse transform unit 1426, and an adder 1428. The entropy decoder 1422 may perform entropy decoding to invert processes performed by the entropy coder 1318 (FIG. 13). The dequantizer 1424 may invert operations of the quantizer 1416 of the pixel block coder 1310 (FIG. 13). Similarly, the inverse transform unit 1426 may invert operations of the transform unit 1314 (FIG. 13). They may use the quantization parameters $Q_P$ and transform modes M that are provided in the coded video data stream. Because quantization is likely to truncate data, the data recovered by the dequantizer 1424, likely will possess coding errors when compared to the input data presented to its counterpart quantizer 1416 in the pixel block coder 1310 (FIG. 13).

The adder 1428 may invert operations performed by the subtractor 1312 (FIG. 13). It may receive a prediction pixel block from the predictor 1450 as determined by prediction references in the coded video data stream. The adder 1428 may add the prediction pixel block to reconstructed residual values output by the inverse transform unit 1426 and may output reconstructed pixel block data.

The in-loop filter 1430 may perform various filtering operations on reconstructed pixel block data. As illustrated, the in-loop filter 1430 may include a deblocking filter 1432 and an SAO filter 1434. The deblocking filter 1432 may filter data at seams between reconstructed pixel blocks to reduce discontinuities between the pixel blocks that arise due to coding. SAO filters 1434 may add offset to pixel values according to an SAO type, for example, based on edge direction/shape and/or pixel level. Other types of in-loop filters may also be used in a similar manner. Operation of the deblocking filter 1432 and the SAO filter 1434 ideally would mimic operation of their counterparts in the coding system 1300 (FIG. 13). Thus, in the absence of transmission errors or other abnormalities, the decoded picture obtained from the in-loop filter 1430 of the decoding system 1400 would be the same as the decoded picture obtained from the in-loop filter 1310 of the coding system 1300 (FIG. 13); in this manner, the coding system 1300 and the decoding system 1400 should store a common set of reference pictures in their respective reference picture stores 1340, 1440.

The reference picture store 1440 may store filtered pixel data for use in later prediction of other pixel blocks. The reference picture store 1440 may store decoded pixel block data of each picture as it is coded for use in intra prediction. The reference picture store 1440 also may store decoded reference pictures.

As discussed, the predictor 1450 may supply the transformed reference block data to the pixel block decoder 1420. The predictor 1450 may supply predicted pixel block data as determined by the prediction reference indicators supplied in the coded video data stream.

The controller 1460 may control overall operation of the coding system 1400. The controller 1460 may set operational parameters for the pixel block decoder 1420 and the predictor 1450 based on parameters received in the coded video data stream. As is relevant to the present discussion, these operational parameters may include quantization parameters $Q_P$ for the dequantizer 1424 and transform modes M for the inverse transform unit 1411. As discussed, the received parameters may be set at various granularities of image data, for example, on a per pixel block basis, a per picture basis, a per slice basis, a per LCU basis, or based on other types of regions defined for the input image.

And, further, the controller 1460 may perform transforms of reference pictures stored in the reference picture store 1440 when new formats are detected in coded video data.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

For example, the techniques described herein may be performed by a central processor of a computer system. FIG. 15 illustrates an exemplary computer system 1500 that may perform such techniques. The computer system 1500 may include a central processor 1510, one or more cameras 1520, a memory 1530, and a transceiver 1540 provided in communication with one another. The camera 1520 may perform image capture and may store captured image data in the memory 1530. Optionally, the device also may include sink components, such as a coder 1550 and a display 1560, as desired.

The central processor 1510 may read and execute various program instructions stored in the memory 1530 that define an operating system 1512 of the system 1500 and various applications 1514.1-1514.N. The program instructions may perform coding mode control according to the techniques described herein. As it executes those program instructions, the central processor 1510 may read, from the memory 1530, image data created either by the camera 1520 or the applications 1514.1-1514.N, which may be coded for transmission. The central processor 1510 may execute a program that operates according to the principles of FIG. 6. Alternatively, the system 1500 may have a dedicated coder 1550 provided as a standalone processing system and/or integrated circuit.

As indicated, the memory 1530 may store program instructions that, when executed, cause the processor to perform the techniques described hereinabove. The memory 1530 may store the program instructions on electrical-, magnetic- and/or optically-based storage media.

The transceiver 1540 may represent a communication system to transmit transmission units and receive acknowledgement messages from a network (not shown). In an embodiment where the central processor 1510 operates a software-based video coder, the transceiver 1540 may place data representing state of acknowledgment message in memory 1530 to retrieval by the processor 1510. In an embodiment where the system 1500 has a dedicated coder, the transceiver 1540 may exchange state information with the coder 1550.

The foregoing discussion has described the principles of the present disclosure in terms of encoding systems and decoding systems. As described, an encoding system typically codes video data for delivery to a decoding system where the video data is decoded and consumed. As such, the encoding system and decoding system support coding, delivery and decoding of video data in a single direction. In applications where bidirectional exchange is desired, a pair of terminals 110, 120 (FIG. 1) each may possess both an encoding system and a decoding system. An encoding system at a first terminal 110 may support coding of video data in a first direction, where the coded video data is delivered to a decoding system at the second terminal 120. Moreover, an encoding system also may reside at the second terminal 120, which may code of video data in a second direction, where the coded video data is delivered to a decoding system at the second terminal 110. The principles of the present disclosure may find application in a single direction of a bidirectional video exchange or both directions as may be desired by system operators. In the case where these principles are applied in both directions, then the operations illustrated in FIGS. 8-11 may be performed independently for each directional exchange of video.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method, comprising:
    processing input video having an input organizational format to generate processed video in a selected organizational format for multi-directional video wherein the selected organizational format includes at least one larger sub-image corresponding to a higher prioritized direction of view and a plurality of smaller sub-images corresponding to lower prioritized directions of view,
    selecting a first selected organizational format based on a first prioritization amongst directions of view;
    coding the processed video in the first selected organizational format,
    decoding select coded frames as reference frames,
    storing the decoded reference frames in the first selected organizational format;
    selecting a second selected organizational format based on a second prioritization amongst the directions of view;
    responsive to an indication of a change in view direction prioritization from the first prioritization to the second prioritization, transforming the decoded reference frames from the first selected organizational format to the second selected organizational format,
    predictively coding video frames in the second selected organizational format using the transformed reference frame(s) as source(s) of prediction, and
    outputting the coded video frames to a channel.

2. The method claim 1, wherein the first format contains a prioritization of a first region of the input video over a second region of the input video, and the second format contains a prioritization of the second region of the input video over the first region of the input video.

3. The method claim 1, wherein the first format contains a prioritization of a first portion of the input video over another portion of the input video, and the second format contains a prioritization of a second portion of the input video over the other portion of the input video.

4. The method claim 1, wherein the first and second formats are derived from a common source format of the input video.

5. The method claim 4, wherein the source format is a cube map format.

6. The method claim 4, wherein the source format is an equirectangular format.

7. A method, comprising:
    decoding a first portion of a sequence of predictively-coded multi-directional video data, the coded video data having a coded organizational format that changes over the sequence wherein the coded organizational format includes at least one larger sub-image corresponding to a higher prioritized direction of view and a plurality of smaller sub-images corresponding to lower prioritized directions of view,
    storing select frames obtained from the decoding as reference frames for use in later predictions, wherein the reference frames are stored in a first organizational format of multi-directional images selected based on a first prioritization of directions of view;
    responsive to an indication of a change in a view direction prioritization from the first prioritization to a second prioritization of directions of view, transforming the decoded reference frames from the first organizational format to a second organizational format selected based on the second prioritization of the directions of view,
    predictively decoding a second portion of the sequence having coded video frames in the second organizational format using the transformed reference frame(s) as source(s) of prediction, and
    outputting the coded video frames to a sink device.

8. The method claim 7, wherein the first format contains a prioritization of a first region of the coded video over a second region of the coded video, and the second format contains a prioritization of the second region of the coded video over the first region of the coded video.

9. The method claim 7, wherein the first format contains a prioritization of a first portion of the coded video over another portion of the coded video, and the second format contains a prioritization of a second region of the coded video over the other portion of the coded video.

10. The method claim 7, wherein the first and second formats are derived from a common source format of the coded video.

11. The method claim 10, wherein the source format is a cube map format.

12. The method claim 10, wherein the source format is an equirectangular format.

13. A coding system, comprising:
an image processor having an input for video in a multi-directional source format and an output for video in a selected organizational format for multi-directional video wherein the selected organizational format includes at least one larger sub-image corresponding to a higher prioritized direction of view and a plurality of smaller sub-images corresponding to lower prioritized directions of view,
a video coder having an input for video from the image processor in a first coding format, an input for prediction data, and an output for predictively-coded video data,
a video decoder having in input for the predictively-coded video data from the video coder and an output for decoded video data,
a reference picture store having an input for the decoded video data from the video decoder,
a predictor, having an input for the video from the image processor in the first coding format, an input for stored reference picture data from the reference picture store and an output for the prediction data, and
a controller, responsive to an indication of a change in view direction prioritization from a first prioritization of directions of view to a second prioritization of the directions of view, that transforms reference picture data in the reference picture store from a first organizational format for multi-directional video selected based on the first prioritization to a second organizational format selected based on the second prioritization.

14. The system of claim 13, wherein the first organizational format contains a prioritization of a first region of the source format over a second region of the source format, and the second coding format contains a prioritization of the second region of the source format over the first region of the source format.

15. The system of claim 13, wherein the first organizational contains a prioritization of a first portion of the source format over another portion of the source format, and the second coding format contains a prioritization of a second region of the source format over the other portion of the source format.

16. A decoding system, comprising:
a video decoder having an input for predictively-coded multi-directional video data and an output for decoded video data,
a reference picture store having an input for the decoded video data from the video decoder,
a predictor, having an input for coding mode data associated with the predictively-coded video data, an input for stored reference picture data from the reference picture store and an output for the prediction data, and
a controller, responsive to an indication of a change in a view direction prioritization from a first prioritization amongst directions of view to a second prioritization amongst the directions of view, that transforms reference picture data in the reference picture store from a first organizational format for multi-directional video based on the first prioritization to a second organizational format for multi-directional video based on the a second prioritization, wherein an organizational format for multi-directional video includes at least one larger sub-image corresponding to a higher prioritized direction of view and a plurality of smaller sub-images corresponding to lower prioritized directions of view.

17. The system of claim 16, wherein the first organizational format contains a prioritization of a first region of the coded video over a second region of the coded video, and the second format contains a prioritization of the second region of the coded video over the first region of the coded video.

18. The system of claim 16, wherein the first organizational format contains a prioritization of a first portion of the coded video over another portion of the coded video, and the second format contains a prioritization of a second region of the coded video over the other portion of the coded video.

19. The system of claim 16, wherein the first and second organizational formats are derived from a common source format of the coded video.

20. Non-transitory computer readable medium storing program instructions that, when executed by a processing device, cause the device to:
process multi-directional input video having an input organizational format to generate processed video in a selected organizational format for multi-directional video wherein the selected organizational format includes at least one larger sub-image corresponding to a higher prioritized direction of view and a plurality of smaller sub-images corresponding to lower prioritized directions of view,
select a first selected organizational format based on a first prioritization amongst directions of view;
code the processed video in a first organizational format,
decode select coded frames as reference frames,
store the decoded reference frames;
select a second selected organizational format based on a second prioritization amongst the directions of view;
responsive to an indication of a change in view direction prioritization from the first prioritization to the second prioritization, transform the decoded reference frames from the first selected organizational format to the second selected organizational format,
predictively code video frames in the second selected organizational format using the transformed reference frame(s) as source(s) of prediction, and
output the coded video frames to a channel.

21. Non-transitory computer readable medium storing program instructions that, when executed by a processing device, cause the device to:
decode a sequence of predictively-coded multi-directional video data, the coded video data having an organizational format that changes over the sequence, wherein a coded organizational format includes at least one larger sub-image corresponding to a higher prioritized direction of view and a plurality of smaller sub-images corresponding to lower prioritized directions of view,
store select frames obtained from the decoding as reference frames for use in later predictions, wherein the reference frames are stored in a first organizational format selected based on a first prioritization of directions of view;
responsive to an indication of a change in a view direction prioritization from the first prioritization to a second prioritization of directions of view, transform the decoded reference frames from the first organizational format to a second organizational format selected based on the second prioritization of the directions of view, predictively decode coded video frames in the second organizational format using transformed reference frame(s) as source(s) of prediction.

22. A method, comprising:

processing multi-directional input video frames having an input arrangement of regions of view directions within a composite multi-directional frame to generate processed video in a selected arrangement of the regions wherein the selected arrangement includes at least one larger region corresponding to a higher prioritized view direction and a plurality of smaller regions corresponding to lower prioritized view directions, selecting a first arrangement of the regions based on a first prioritization amongst view directions, coding the processed video in the first selected arrangement, decoding select coded frames as reference frames, storing the decoded reference frames in the first selected arrangement;

selecting a second arrangement of the regions based on a second prioritization amongst the view directions, responsive to an indication of a change in view direction prioritization from the first prioritization to the second prioritization, transforming the decoded reference frames from the first selected arrangement to the second selected arrangement, predictively coding video frames in the second selected arrangement using the transformed reference frame(s) as source(s) of prediction, and outputting the coded video frames to a channel.

* * * * *